United States Patent
Furukawa et al.

(10) Patent No.: US 12,535,401 B2
(45) Date of Patent: Jan. 27, 2026

(54) PARTICLE ANALYSIS SYSTEM, PARTICLE ANALYSIS METHOD, AND FLOW CYTOMETER SYSTEM

(71) Applicant: SONY GROUP CORPORATION, Tokyo (JP)

(72) Inventors: Akio Furukawa, Tokyo (JP); Yusaku Nakashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 66 days.

(21) Appl. No.: 18/293,373

(22) PCT Filed: Mar. 23, 2022

(86) PCT No.: PCT/JP2022/013376
§ 371 (c)(1),
(2) Date: Jan. 30, 2024

(87) PCT Pub. No.: WO2023/032320
PCT Pub. Date: Mar. 9, 2023

(65) Prior Publication Data
US 2024/0337584 A1 Oct. 10, 2024

(30) Foreign Application Priority Data
Sep. 3, 2021 (JP) .................. 2021-144272

(51) Int. Cl.
*G01N 15/14* (2024.01)
*G01N 15/01* (2024.01)
(Continued)

(52) U.S. Cl.
CPC ........... *G01N 15/149* (2024.01); *G01N 15/01* (2024.01); *G01N 15/1433* (2024.01);
(Continued)

(58) Field of Classification Search
CPC .............. G01N 15/01; G01N 15/1433; G01N 15/1434; G01N 15/149; G01N 2015/1006; G01N 2015/1452; G02B 21/367
See application file for complete search history.

(56) References Cited

U.S. PATENT DOCUMENTS

2006/0114553 A1 6/2006 Laudo
2015/0198537 A1* 7/2015 Kimura ................. G01N 21/03
506/12
2016/0265970 A1 9/2016 Suh et al.

FOREIGN PATENT DOCUMENTS

JP 2010-263872 A 11/2010
JP 2011-226970 A 11/2011
(Continued)

OTHER PUBLICATIONS

International Search Report and Written Opinion of PCT Application No. PCT/JP2022/013376, issued on May 31, 2022, 10 pages of ISRWO.

*Primary Examiner* — Mark R Gaworecki
(74) *Attorney, Agent, or Firm* — CHIP LAW GROUP

(57) ABSTRACT

An operation time is shortened. A particle analysis system according to an embodiment includes an imaging unit (13) configured to detect, as an event, a luminance change of light from a particle in a container, a first scanning unit (14) configured to scan a focal position of the imaging unit in a depth direction of the container, and a processing unit (103) configured to measure a state in the container based on the events detected at a plurality of the focal positions of the imaging unit by scanning of the first scanning unit.

20 Claims, 20 Drawing Sheets

(51) Int. Cl.
  *G01N 15/1433* (2024.01)
  *G01N 15/1434* (2024.01)
  *G01N 15/149* (2024.01)
  *G02B 21/36* (2006.01)
  *G01N 15/10* (2006.01)

(52) U.S. Cl.
  CPC ....... *G01N 15/1434* (2013.01); *G02B 21/367* (2013.01); *G01N 2015/1006* (2013.01); *G01N 2015/1452* (2013.01)

(56) References Cited

FOREIGN PATENT DOCUMENTS

| | | |
|---|---|---|
| JP | 2017-091518 A | 5/2017 |
| JP | 2018-007587 A | 1/2018 |
| WO | 2014/057713 A1 | 4/2014 |
| WO | 2021/019830 A1 | 2/2021 |
| WO | 2021/241757 A1 | 12/2021 |

\* cited by examiner

FIG.17

PARTICLE ANALYSIS SYSTEM, PARTICLE ANALYSIS METHOD, AND FLOW CYTOMETER SYSTEM

CROSS REFERENCE TO RELATED APPLICATIONS

This application is a U.S. National Phase of International Patent Application No. PCT/JP2022/013376 filed on Mar. 23, 2022, which claims priority benefit of Japanese Patent Application No. JP 2021-144272 filed in the Japan Patent Office on Sep. 3, 2021. Each of the above-referenced applications is hereby incorporated herein by reference in its entirety.

FIELD

The present disclosure relates to a particle analysis system, a particle analysis method, and a flow cytometer system.

BACKGROUND

Conventionally, as a method of analyzing (or interpreting. In the present disclosure, interpreting includes meaning of analyzing) proteins of biological-related microparticles such as cells, microorganisms, and liposomes, a flow cytometry exists. An apparatus used for the flow cytometry is referred to as a flow cytometer (FCM). In the flow cytometer, microparticles flowing through a flow channel in a line are irradiated with laser light having a specific wavelength, and light such as fluorescence, forward scattered light, and side scattered light emitted from each microparticle is converted into an electrical signal by a photodetector and quantified. Thereafter, the result is statistically analyzed, thereby determining the type, size, structure, and the like of each microparticle.

In addition, in recent years, a so-called cell sorter-type flow cytometer, which sorts a target microparticle from a sheath flow based on a real-time analysis result of the microparticle, has also been developed.

CITATION LIST

Patent Literature

Patent Literature 1: JP 2011-226970 A

SUMMARY

Technical Problem

In a particle analysis system that sorts microparticles, such as a cell sorter-type flow cytometer, it is necessary to confirm whether microparticles are correctly sorted.

For example, in the flow cytometer that identifies and sorts specific cells by fluorescent labeling from a biological sample in which many cells are suspended in a liquid, when it is necessary to connect cells to be sorted to subsequent processing such as gene analysis or culture in units of one cell, index sorting for individually sorting the identified cells one by one into a well plate is used. In such index sorting, it is important for the reliability of the subsequent analysis/culture step that a single cell can be sorted into each well as intended. However, due to random disturbance of a sorting mechanism of the flow cytometer, an error indicating that two or more cells are sorted into the same well or one cell cannot be sorted occurs to a considerable extent. In order to remove the well in which the error has occurred before the subsequent processing is performed, it is necessary to confirm whether the cells are correctly sorted one by one in the well.

However, conventionally, since visual observation and a frame-type camera having a shallow focal depth are used to confirm whether the microparticles are correctly sorted, there is a problem in that it takes a long time to perform a confirmation operation.

Therefore, the present disclosure provides a particle analysis system, a particle analysis method, and a flow cytometer system capable of shortening an operation time.

Solution to Problem

To solve the problems described above, a particle analysis system according to an embodiment of the present disclosure includes: an imaging unit configured to detect, as an event, a luminance change of light from a particle in a container; a first scanning unit configured to scan a focal position of the imaging unit in a depth direction of the container; and a processing unit configured to measure a state in the container based on the events detected at a plurality of the focal positions of the imaging unit by scanning of the first scanning unit.

BRIEF DESCRIPTION OF DRAWINGS

FIG. 17 is a diagram illustrating an example of a user interface according to the first embodiment.

DESCRIPTION OF EMBODIMENTS

Figure 1:
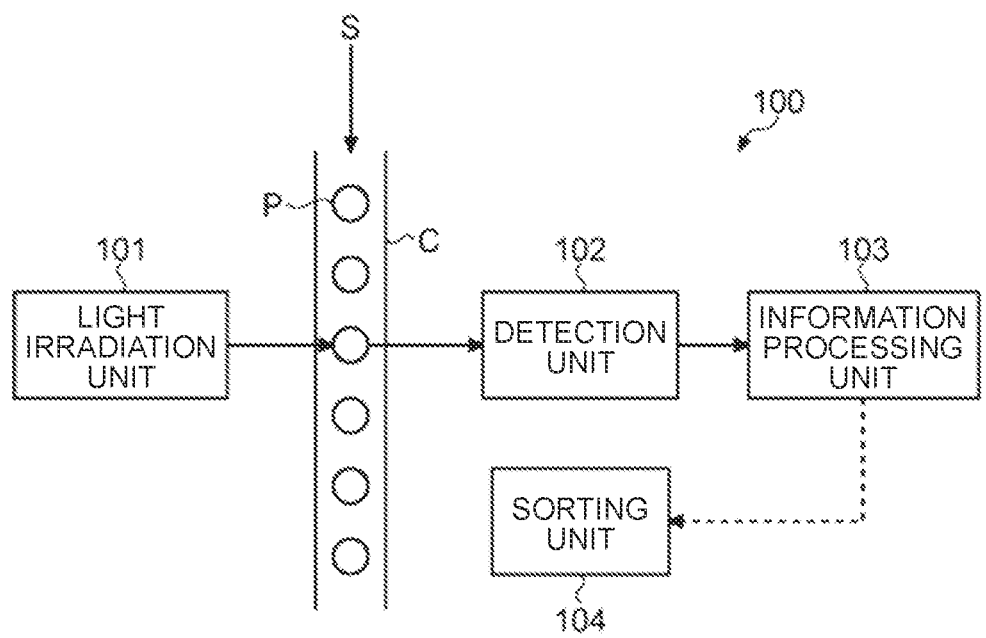
FIG. 1 is a schematic diagram illustrating a configuration example of a particle analysis system according to the present disclosure.

Hereinafter, embodiments of the present disclosure will be described in detail with reference to the drawings. It is noted that, in each of the following embodiments, the same parts are denoted by the same reference numerals, and redundant description will be omitted.

In addition, the present disclosure will be described according to the following item order.
1. Introduction
2. Schematic configuration example of particle analysis system
3. First Embodiment
3.1 System configuration example
3.2 Configuration example of image sensor
3.3 Configuration example of EVS
3.4 Schematic configuration example of measurement unit for the number of particles
3.5 Configuration example of well plate and well
3.6 Regarding measurement of the number of biological particles
3.7 Example of flow of operation of measuring the number of particles
3.8 Example of measurement processing for the number of particles
3.9 Specific example of measurement processing for the number of particles
3.10 Specific example of user interface
3.11 Apparatus form of particle analysis system
3.12 Action and effect
3.13 Modification
3.13.1 First modification
3.13.2 Second modification
3.13.3 Other modifications
4. Second Embodiment
4.1 Schematic configuration example of measurement unit for the number of particles
4.2 Example of flow of operation of measuring the number of particles
4.3 Action and effect
5. Hardware configuration 1. Introduction As described above, in the index sorting in which identified cells are individually sorted into a well plate one by one, it is important for reliability of the subsequent analysis/culture step that a single cell can be sorted into each well as intended. However, due to random disturbance of a sorting mechanism of a flow cytometer, an error indicating that two or more cells are sorted into the same well or one cell cannot be sorted occurs to a considerable extent. It is desirable to detect the well in which the error has occurred in advance and remove the well before the subsequent processing is performed.

As a method of detecting the error without damaging a living cell, optical microscope observation is effective. However, a focal depth at optical magnification capable of detecting a cell having a size of about several micrometers is usually 0.1 mm (millimeters) or less, and the focal depth is very small with respect to a liquid depth in a well having a size of about 10 mm. Therefore, in order to measure the number of cells in the liquid without omission, it is necessary to scan a focal plane of an optical microscope in the depth direction.

In the case of counting the number of cells in each focal plane while scanning the focal plane of the optical microscope, conventionally, an operator visually counts the number of cells or acquires an image in each focal plane one by one using a frame-type camera.

In the case of visually counting the number of cells, it is necessary to keep the scanning speed of the focal plane to such an extent that a cell image can be clearly identified without feeling movement blurring, and in addition, an operation time is required to manually record an inspection result, and as such it takes about 5 to 10 seconds to inspect one well having a depth of 10 mm.

On the other hand, in the case of using the frame-type camera, although it is possible to perform inspection at a faster focal plane scanning speed than in the case of visual observation, imaging with the number of pixels of 1 million or more, which is necessary to fit the entire well having a diameter of several mm to the angle of view with a resolution capable of detecting a cell having a diameter of several macrometers, is performed about 100 times over the depth of 10 mm in units of the focal depth of 0.1 mm. Therefore, for example, even in a case where pixel gradation is assumed to be 8 bits, a total data amount of image data that needs to be acquired and transferred becomes an enormous data amount of about 800 Mbits, and it takes a long time of about several seconds to acquire and transfer the image data. Furthermore, since it is necessary to synchronize a frame acquisition timing with a focal depth interval of scanning, a scanning mechanism having high speed and high positional accuracy, such as a stepping motor with a built-in position sensor, is required, and problems such as an increase in device cost and an increase in device size also occur.

Therefore, in the following embodiments, a particle analysis system, a particle analysis method, and a flow cytometer system capable of shortening an operation time are provided. For example, in some of the following embodiments, there are provided the particle analysis system, the particle analysis method, and the flow cytometer system capable of shortening the time required to perform a confirmation operation as to whether microparticles are correctly sorted while suppressing an increase in device cost and an increase in device size.

2. Schematic Configuration Example of Particle Analysis System

FIG. 1 illustrates a schematic configuration example of the particle analysis system according to the present disclosure. A particle analysis system 100 illustrated in FIG. 1 includes a light irradiation unit 101 that irradiates a biological sample S flowing through a flow channel C with light, a detection unit 102 that detects light generated by the irradiation, and an information processing unit 103 that processes information regarding the light detected by the detection unit 102. Examples of the particle analysis system 100 can include a flow cytometer and an imaging flow cytometer. The particle analysis system 100 includes a sorting unit 104 that sorts a specific microparticle (in the present description, referred to as a biological particle) P in the biological sample S. Examples of the particle analysis system 100 including the sorting unit 104 include a cell sorter.
(Biological Sample)

The biological sample S may be a liquid sample containing the biological particle P. The biological particle P is, for example, a cell or a non-cellular biological particle. Further, the biological particle P may be a microorganism such as yeast or bacteria. The cell may be a living cell, and more specific examples thereof include blood cells such as a red blood cell and a white blood cell, and germ cells such as a sperm and a fertilized egg. In addition, the cell may be directly collected from a specimen such as whole blood, or may be cultured cells acquired after culture. Examples of the non-cellular biological particle include an extracellular vesicle, particularly an exosome and a micro vesicle. The biological particle P may be labeled with one or more labeling substances (for example, a dye (particularly, a fluorescent dye) and a fluorescent dye-labeled antibody). It is noted that a particle other than the biological particle may be analyzed by the particle analysis system 100 of the present disclosure, or a bead or the like may be analyzed for calibration or the like.
(Flow Channel)

The flow channel C may be configured to allow the biological sample S to flow therethrough. In particular, the flow channel C may have a flow in which the biological particles P contained in the biological sample S are arranged substantially in a line. A flow channel structure including the flow channel C may be designed so that a laminar flow is formed. Particularly, the flow channel structure is designed so as to form the laminar flow in which a flow of the biological sample S (a sample flow) is wrapped by a flow of a sheath liquid. The design of the flow channel structure may be appropriately selected by those skilled in the art, and a known flow channel structure may be adopted. The flow channel C may be formed in the flow channel structure such as a microchip (a chip having a flow channel on the order of micrometers) or a flow cell. The width of the flow channel C is 1 mm (millimeter) or less, and may be particularly 10 μm (micrometer) or more and 1 mm or less. The flow channel C and the flow channel structure including the flow channel C may be formed of a material such as plastic or glass.

The apparatus of the present disclosure may be configured such that the biological sample S flowing though the flow channel C, particularly, the biological particle P in the biological sample S is irradiated with light from the light irradiation unit 101. The apparatus of the present disclosure may be configured such that an irradiation point (interrogation point) of the light with respect to the biological sample S is in the flow channel structure having the flow channel C formed therein, or may be configured such that the irradiation point of the light is outside the flow channel structure. As an example of the former, a configuration in which the flow channel C in the microchip or the flow cell is irradiated with the light can be mentioned. In the latter, the biological particle P after exiting the flow channel structure (particularly, a nozzle portion thereof) may be irradiated with the light, and an example thereof includes a flow cytometer of a jet in air system.
(Light Irradiation Unit)

The light irradiation unit 101 includes a detection light source unit that emits light and a light guidance optical system that guides the light to the flow channel C. The detection light source unit includes one or a plurality of light sources. The type of the light source may be, for example, a laser light source or a light emitting diode (LED). The wavelength of the light emitted from each light source may be any wavelength of ultraviolet light, visible light, or infrared light. The light guidance optical system includes, for example, an optical component such as a beam splitter group, a mirror group, or an optical fiber. In addition, the light guidance optical system may include a lens group for collecting light, and may include, for example, an objective lens. The biological sample S may be irradiated with light at one or more irradiation points. The light irradiation unit 101 may be configured to collect light emitted from one or a plurality of different light sources with respect to one irradiation point.
(Detection Unit)

The detection unit 102 includes at least one photodetector that detects light generated by irradiating the particle with the light using the light irradiation unit 101. The light to be detected is, for example, fluorescence, scattered light (for example, any one or more of forward scattered light, backward scattered light, and side scattered light), transmitted light, or reflected light. Each photodetector includes one or more light receiving elements, for example, a light receiving element array. Each photodetector may include, as the light receiving element, one or a plurality of photodiodes such as a photomultiplier tube (PMT) and/or an avalanche photodiode (APD) and a multi-pixel photon counter (MPPC). The photodetector includes, for example, a PMT array in which a plurality of PMTs are arranged in a one-dimensional direction. Furthermore, the detection unit 102 may include an imaging element such as a charge coupled device (CCD) or a complementary metal-oxide-semiconductor (CMOS). The detection unit 102 can acquire biological particle information on the biological particle P by the imaging element.

As described above, the biological particle information can include at least one of a biological particle image of the biological particle, a feature amount of the biological particle, a piece of attribute information of the biological particle, and the like. Furthermore, the biological particle image of the biological particle may include, for example, a bright field image, a dark field image, a fluorescence image, and the like.

The detection unit 102 includes a detection optical system that causes light having a predetermined detection wavelength to reach a corresponding photodetector. The detection optical system includes a spectroscopic unit such as a prism or a diffraction grating, or a wavelength separation unit such as a dichroic mirror or an optical filter. The detection optical system may be configured, for example, to disperse light from the biological particle P and detect the light in different wavelength regions by a plurality of photodetectors, the number of which is greater than the number of fluorescent dyes. A flow cytometer including such a detection optical system is referred to as a spectral-type flow cytometer. Furthermore, for example, the detection optical system may be configured to separate light corresponding to a fluorescence wavelength region of the fluorescent dye from the light from the biological particle P, and cause a corresponding photodetector to detect the separated light.

Furthermore, the detection unit 102 may include a signal processing unit that converts an electrical signal obtained by the photodetector into a digital signal. The signal processing unit may include an A/D converter serving as a device that performs the conversion. The digital signal obtained by the conversion by the signal processing unit can be transmitted to the information processing unit 103. The digital signal can be handled as data related to light (hereinafter also referred to as "light data") by the information processing unit 103. The light data may be, for example, light data including fluorescence data. More specifically, the light data may be light intensity data, and the light intensity may be light intensity data (feature amounts such as an area, a height, and a width may be included) of light including fluorescence.

(Information Processing Unit)

The information processing unit 103 includes, for example, a processing unit that executes processing of various pieces of data (for example, the light data) and a storage unit that stores various pieces of data. When acquiring the light data corresponding to the fluorescent dye from the detection unit 102, the processing unit can perform fluorescence leakage correction (compensation processing) on the light intensity data. In addition, in the case of the spectral-type flow cytometer, the processing unit performs fluorescence separation processing on the light data and acquires the light intensity data corresponding to the fluorescent dye.

The fluorescence separation processing may be performed according to, for example, an unmixing method described in JP 2011-232259 A. When the detection unit 102 includes an imaging element, the processing unit may acquire a piece of form information of the biological particle P based on an image acquired by the imaging element. The storage unit may be configured to be able to store the acquired light data. The storage unit may be further configured to be able to store spectral reference data used in the unmixing processing.

The particle analysis system 100 includes the sorting unit 104 to be described later, and the information processing unit 103 can determine whether to sort the biological particle P based on the light data and/or the form information. Then, the information processing unit 103 controls the sorting unit 104 based on the determination result, and the biological particle P can be sorted by the sorting unit 104.

The information processing unit 103 may be configured to be able to output various pieces of data (for example, a piece of light data and an image). For example, the information processing unit 103 can output various pieces of data (for example, a two-dimensional plot, a spectral plot, and the like) generated based on the light data. Furthermore, the information processing unit 103 may be configured to be able to receive inputs of various pieces of data, and for example, receives gating processing on a plot by a user. The information processing unit 103 can include an output unit (for example, a display or the like) or an input unit (for example, a keyboard or the like) for executing the output or the input.

The information processing unit 103 may be configured as a general-purpose computer, and may be configured as an information processing apparatus including, for example, a central processing unit (CPU), a random access memory (RAM), and a read only memory (ROM). The information processing unit 103 may be included in a housing provided with the light irradiation unit 101 and the detection unit 102, or may be disposed outside the housing. Furthermore, various pieces of processing or various functions by the information processing unit 103 may be implemented by a server computer or a cloud connected via a network.

(Sorting Unit)

The sorting unit 104 can execute sorting of the biological particle P, for example, according to the determination result by the information processing unit 103. A sorting method may be a method in which a droplet containing the biological particle P is generated by vibration, a charge is applied to the droplet to be sorted, and the traveling direction of the droplet is controlled by an electrode. The sorting method may be a method of controlling the traveling direction of the biological particle P in the flow channel structure to perform sorting. The flow channel structure is provided with, for example, a control mechanism by a pressure (injection or suction) or a charge. Examples of the flow channel structure include a chip (for example, a chip described in JP 2020-76736 A) configured to have a flow channel structure in which the flow channel C branches into a collection flow channel and a waste liquid flow channel on the downstream side thereof, and to allow the specific biological particle P to be collected into the collection flow channel.

3. First Embodiment

Next, a particle analysis system, a particle analysis method, and a flow cytometer system according to a first embodiment of the present disclosure will be described in detail with reference to the drawings.

3.1 System Configuration Example

Figure 2:
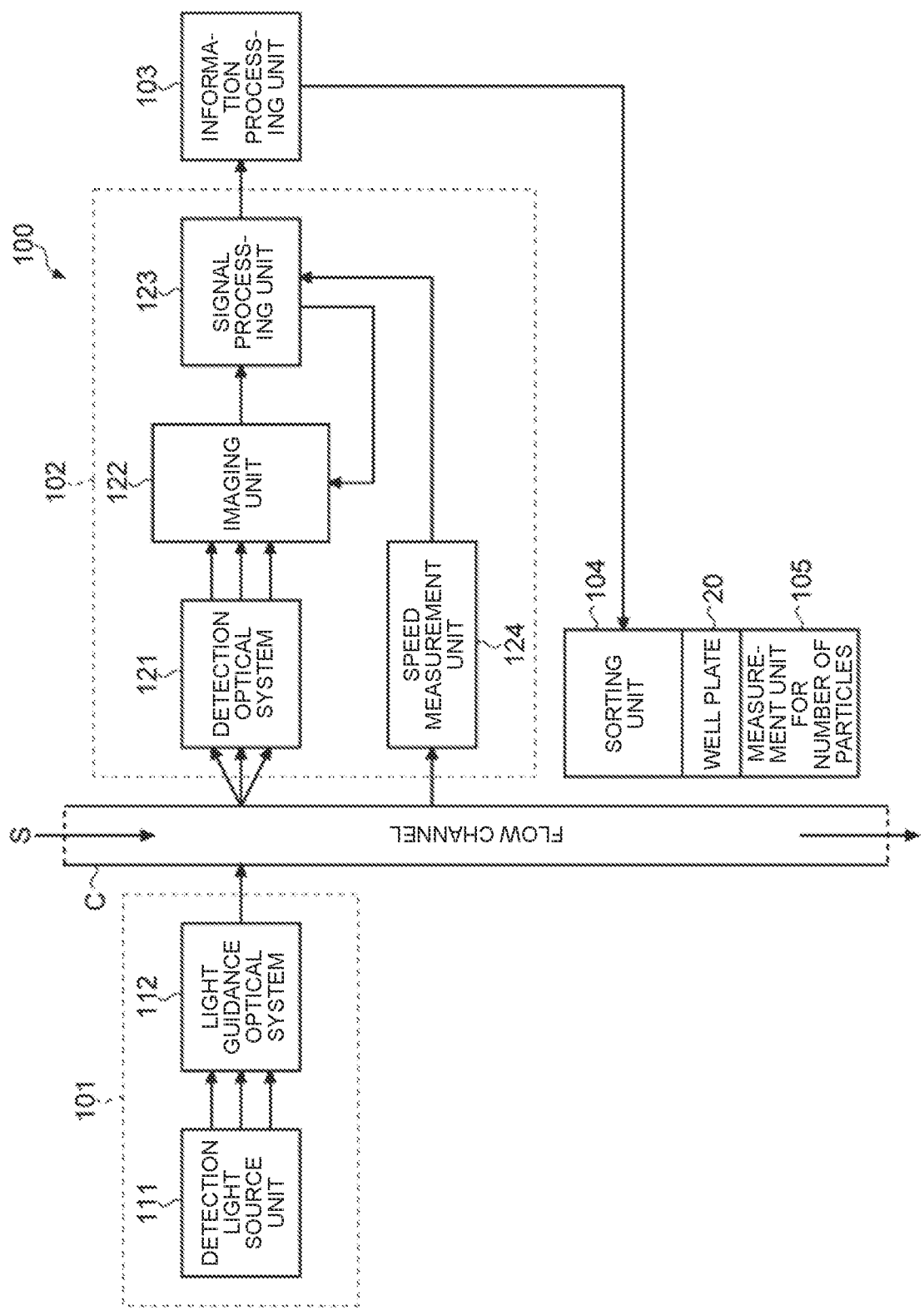
FIG. 2 is a block diagram illustrating a more specific configuration example of a particle analysis system according to a first embodiment.

FIG. 2 is a block diagram illustrating a more specific configuration example of the particle analysis system according to the present embodiment. In the present embodiment and the following embodiment, the particle analysis system may be configured as a system in which a plurality of devices are combined with each other.

As illustrated in FIG. 2, the particle analysis system 100 according to the present embodiment includes a detection light source unit 111 and a light guidance optical system 112 constituting the light irradiation unit 101, a detection optical system 121, an imaging unit 122, a signal processing unit 123, and a speed measurement unit 124 constituting the detection unit 102, the information processing unit 103, the sorting unit 104, and a measurement unit for the number of particles 105, and an image of the fluorescence, the reflected light, and/or the transmitted light emitted from the biological particle P in the biological sample S flowing through the flow channel C is observed in real time, and the target biological particle P is sorted into each well of a well plate 20 based on the observation result. Then, the number of biological particles P sorted into each well of the well plate 20 is measured by the measurement unit for the number of particles 105. It is noted that the detection light source unit 111, the light guidance optical system 112, the detection optical system 121, the information processing unit 103, and the sorting unit 104 may be similar to those described above with reference to FIG. 1.

More specifically, the light (hereinafter, also referred to as excitation light) output from the detection light source unit 111 is collected by the light guidance optical system 112. The collected light is applied to the biological particle P flowing at a high speed in the flow channel C through which the biological sample S in which the biological particle P is suspended has flown. Reflected light or transmitted light and/or fluorescence emitted from the biological particle P irradiated with the light is imaged on a light receiving surface of the imaging unit 122 through the detection optical system 121.

The imaging unit 122 includes, for example, pixels arranged in a two-dimensional lattice pattern. The imaging unit 122 may be a frame-type image sensor that outputs image data (also referred to as frame data) at a predetermined frame rate, or may be an event-based vision sensor (EVS) in which event pixels that detect an event based on a change in luminance of incident light are arranged in a two-dimensional lattice pattern. It is noted that, although details will be described later, the EVS may be a sensor that outputs event data including position information (an X address and a Y address) of a pixel in which an event is detected, polarity information (a positive event/a negative event) of the detected event, information (time stamp) of a time when the event is detected, and the like in a synchronous or asynchronous manner, instead of the frame data.

The frame data acquired at the predetermined frame rate in the imaging unit 122 or a series of event data (hereinafter, also referred to as an event stream) generated in each pixel corresponding to the image of the biological particle P moving on the light receiving surface of the imaging unit 122 is transmitted to the signal processing unit 123.

The speed measurement unit 124 measures, for example, the relative speed of the biological particle P flowing through the flow channel C with respect to the speed measurement unit 124. In the present example, since the case where the speed measurement unit 124 is stationary with respect to the flow channel C is exemplified, in the following description, the speed measurement unit 124 is referred to as measuring the speed of the biological particle P.

For the speed measurement unit 124, various detection methods capable of detecting the speed of the biological particle P, such as an electrostatic method and an optical method, may be adopted. The speed of the biological particle P detected by the speed measurement unit 124 is transmitted to the signal processing unit 123 as needed.

It is noted that the speed measurement unit 124 may be omitted in a case where the speed of the biological particle P is known, such as a case in which the speed of the biological particle P flowing through the flow channel C is controlled to be maintained at a desired speed by controlling a pump system that delivers the biological sample S. However, even in a case where the speed of the biological particle P is known, the speed of the biological particle P may fluctuate due to an ambient temperature, a change in resistance of a liquid delivery system, or the like. Therefore, the speed of the biological particle P may be actually measured using the speed measurement unit 124.

For example, in a case where the imaging unit 122 is the frame-type image sensor, the signal processing unit 123 executes predetermined processing such as white balance adjustment and distortion correction on the input frame data, and sends the processed frame data to the information processing unit 103. On the other hand, in a case where the imaging unit 122 is the EVS, the signal processing unit 123 reconstructs the frame data of the image of the biological particle P from the event stream input from the imaging unit 122 and the speed of the biological particle P, and sends the reconstructed frame data to the information processing unit 103.

It is noted that, in a case where the imaging unit 122 is the EVS, the speed change of the biological particle P is sufficiently gentle as compared with an arrival frequency of the biological particle P. Therefore, the speed of the biological particle P used for reconstructing the frame data is not limited to the speed of the biological particle P itself included in the frame data to be reconstructed, and may be the speed, the average value, or the like of the biological particle P arriving therebefore and/or thereafter.

The information processing unit 103 analyzes the frame data input from the signal processing unit 123, and executes correction to offset the rotation of the biological particle P moving in the flow channel C, extraction of the feature amount, discrimination of the type of the biological particle P, and the like. Furthermore, the information processing unit 103 may include a display unit, and may present, to a user, biological particle information used for analysis, a feature amount based on the result of the analysis, statistical data, a type discrimination result, and the like. Furthermore, the information processing unit 103 may sort and collect the biological particle P of a specific type by controlling the sorting unit 104 based on the type discrimination result of the biological particle P.

The sorting unit 104 sorts the biological particles P flowing through the flow channel C into each well of the well plate 20 one by one based on the type discrimination result of the biological particles P by the information processing unit 103. The specific types of the biological particles P are sorted and collected in each well of the well plate 20.

Although described in detail later, the measurement unit for the number of particles 105 includes a light source unit, an imaging unit, and a scanning mechanism, and measures the number of biological particles P sorted into each well by scanning each well of the well plate 20 in the depth direction (also referred to as a vertical direction) while illuminating each well using the light source unit.

3.2 Configuration Example of Image Sensor

Figure 3:
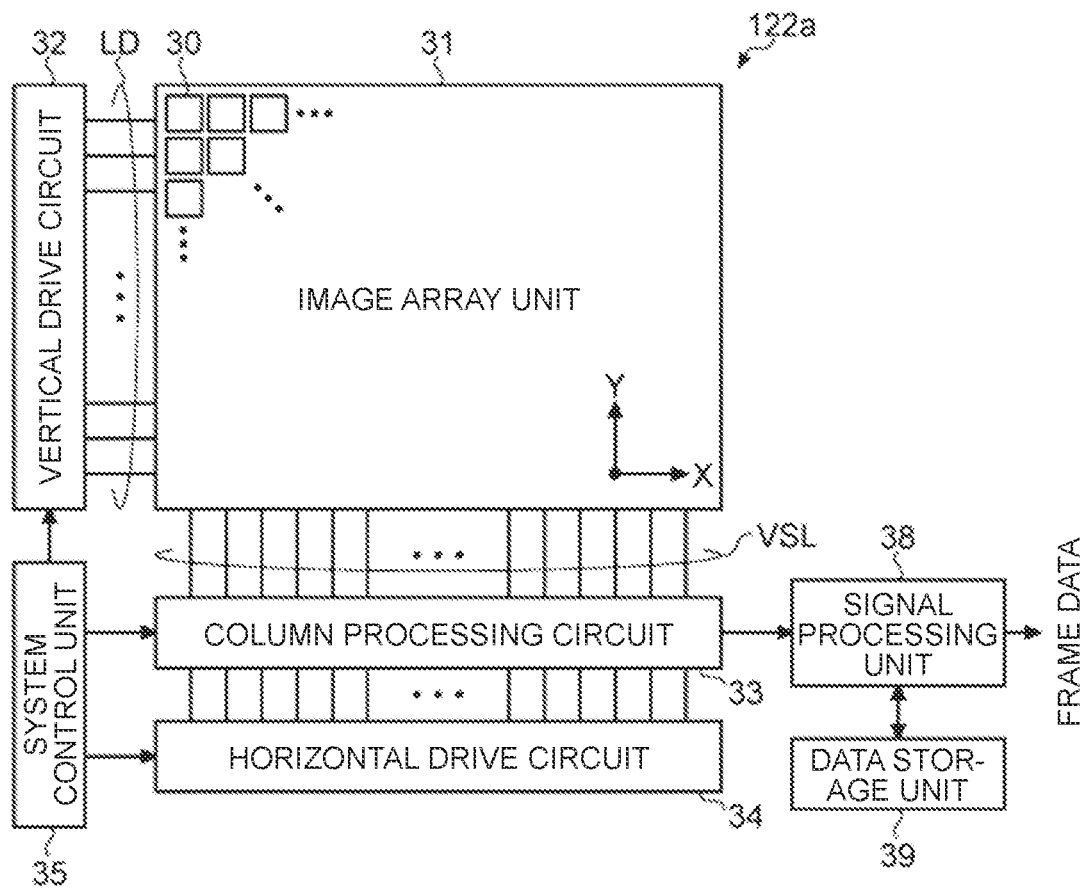
FIG. 3 is a block diagram illustrating a schematic configuration example of an image sensor according to the first embodiment.

Here, a schematic configuration example of the frame-type image sensor that can be used as the imaging unit 122 will be described. FIG. 3 is a block diagram illustrating a schematic configuration example of the frame-type image sensor according to the present embodiment. It is noted that, in the present example, a complementary metal-oxide-semiconductor (CMOS)-type image sensor is exemplified, but the present invention is not limited thereto, and various image sensors capable of acquiring color or monochrome image data, such as a charge-coupled device (CCD)-type image sensor, may be used. Furthermore, the CMOS-type image sensor may be an image sensor generated by applying or partially using a CMOS process.

As illustrated in FIG. 3, an image sensor 122a has, for example, a stack structure in which a semiconductor chip on which a pixel array unit 31 is formed and a semiconductor chip on which a peripheral circuit is formed are stacked. The peripheral circuit may include, for example, a vertical drive circuit 32, a column processing circuit 33, a horizontal drive circuit 34, and a system control unit 35.

The image sensor 122a further includes a signal processing unit 38 and a data storage unit 39. The signal processing unit 38 and the data storage unit 39 may be provided on the same semiconductor chip as the peripheral circuit, or may be provided on another semiconductor chip.

The pixel array unit 31 has a configuration in which pixels 30 each having a photoelectric conversion element that generates and accumulates a charge corresponding to an amount of received light are arranged in a row direction and a column direction, that is, in a two-dimensional lattice shape in a matrix. Here, the row direction refers to an arrangement direction of pixels in a pixel row (lateral direction in drawing), and the column direction refers to an arrangement direction of pixels in a pixel column (longitudinal direction in drawing).

In the pixel array unit 31, a pixel drive line LD is wired in the row direction for each pixel row, and a vertical signal line VSL is wired in the column direction for each pixel column with respect to the matrix-shaped pixel array. The pixel drive line LD transmits a drive signal for performing driving when a signal is read from the pixel. In FIG. 3, each of the pixel drive lines LD is illustrated as one wiring, but the number thereof is not limited to one. One end of the pixel drive line LD is connected to an output terminal corresponding to each row of the vertical drive circuit 32.

The vertical drive circuit 32 includes a shift register, an address decoder, and the like, and drives each pixel of the pixel array unit 31 at the same time for all pixels or on a row-by-row basis. That is, the vertical drive circuit 32 forms a drive unit that controls the operation of each pixel of the pixel array unit 31 together with the system control unit 35 that controls the vertical drive circuit 32. Although a specific configuration of the vertical drive circuit 32 is not illustrated, the vertical drive circuit generally includes two scanning systems including a read scanning system and a sweep scanning system.

The read scanning system sequentially selects and scans the pixels 30 of the pixel array unit 31 on a row-by-row basis in order to read out a signal from the pixel 30. The signal read from the pixel 30 is an analog signal. The sweep scanning system performs sweep scanning on the read row on which read scanning is performed by the read scanning system prior to the read scanning by an exposure time.

By the sweep scanning performed by the sweep scanning system, an unnecessary charge is swept out from the photoelectric conversion element of the pixel 30 of the read row, whereby the photoelectric conversion element is reset. Then, by sweeping out (resetting) the unnecessary charge in the sweep scanning system, a so-called electronic shutter operation is performed. Here, the electronic shutter operation refers to an operation of discarding a charge of the photoelectric conversion element and newly starting exposure (starting accumulation of the charge).

The signal read by a read operation by the read scanning system corresponds to the amount of light received after the immediately preceding read operation or electronic shutter operation. Then, a period from a read timing by the immediately preceding read operation or a sweep timing by the electronic shutter operation to a read timing by the current read operation is a charge accumulation period (also referred to as an exposure period) in the pixel 30.

A signal output from each pixel 30 of the pixel row selectively scanned by the vertical drive circuit 32 is input to the column processing circuit 33 through each of the vertical signal lines VSL for each pixel column. The column processing circuit 33 performs predetermined signal processing on the signal output from each pixel of the selected row through the vertical signal line VSL for each pixel column of the pixel array unit 31, and temporarily stores the pixel signal after the signal processing.

Specifically, the column processing circuit 33 performs at least noise removal processing, for example, correlated double sampling (CDS) processing or double data sampling (DDS) processing, as the signal processing. For example, a fixed pattern noise unique to the pixel, such as a reset noise and a threshold variation of an amplification transistor in the pixel, is removed by the CDS processing. The column processing circuit 33 also has, for example, an analog-digital (AD) conversion function, and the column processing circuit 33 converts an analog pixel signal read out from the photoelectric conversion element into a digital signal, and outputs the digital signal.

The horizontal drive circuit 34 includes a shift register, an address decoder, and the like, and sequentially selects a readout circuit (hereinafter, referred to as a pixel circuit) corresponding to the pixel column of the column processing circuit 33. By the selective scanning by the horizontal drive circuit 34, pixel signals subjected to signal processing for each pixel circuit in the column processing circuit 33 are sequentially output.

The system control unit 35 includes a timing generator configured to generate various timing signals and the like, and performs drive control of the vertical drive circuit 32, the column processing circuit 33, the horizontal drive circuit 34, and the like based on various timings generated by the timing generator.

The signal processing unit 38 has at least an arithmetic processing function, and the signal processing unit performs various types of signal processing such as arithmetic processing on the pixel signal output from the column processing circuit 33. The data storage unit 39 temporarily stores data necessary for the signal processing in the signal processing unit 38. It is noted that, in a case where the signal processing unit 38 has calculation functions such as white balance adjustment and distortion correction, the signal processing unit 123 in FIG. 2 may be omitted.

3.3 Configuration Example of EVS

Figure 4:
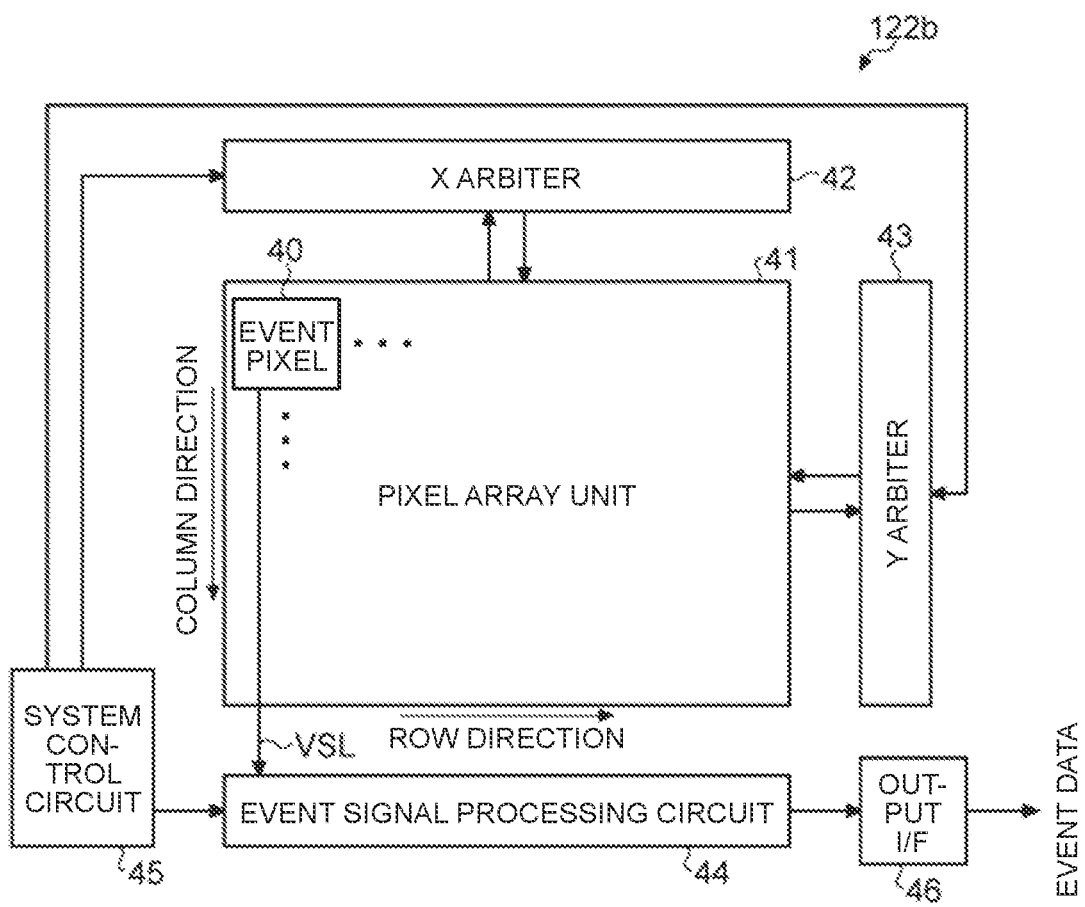
FIG. 4 is a block diagram illustrating a schematic configuration example of an EVS according to the first embodiment.

Next, a schematic configuration example of the EVS that can be used as the imaging unit 122 will be described. FIG. 4 is a block diagram illustrating a schematic configuration example of the EVS according to the present embodiment. As illustrated in FIG. 4, an EVS 122b includes a pixel array unit 41, an X arbiter 42, a Y arbiter 43, an event signal processing circuit 44, a system control circuit 45, and an output interface (I/F) 46.

The pixel array unit 41 has a configuration in which a plurality of event pixels 40 that detect an event based on each luminance change of incident light are arranged in a two-dimensional lattice pattern. It is noted that, in the following description, a row direction (also referred to as a row direction) refers to an arrangement direction of pixels in a pixel row (lateral direction in drawings), and a column direction (also referred to as a column direction) refers to an arrangement direction of pixels in a pixel column (longitudinal direction in drawings).

Each event pixel 40 includes a photoelectric conversion element that generates a charge according to the luminance of the incident light. In a case where a luminance change of the incident light is detected based on a photocurrent flowing from the photoelectric conversion element, the event pixel 40 outputs a request for requesting reading from itself to the X arbiter 42 and the Y arbiter 43, and outputs an event signal indicating that an event has been detected according to arbitration by the X arbiter 42 and the Y arbiter 43.

Each event pixel 40 detects presence or absence of the event based on whether a change exceeding a predetermined threshold value has occurred in the photocurrent according to the luminance of the incident light. For example, each event pixel 40 detects that, as the event, the luminance change exceeds the predetermined threshold value (a positive event) or falls below the predetermined threshold value (a negative event).

When detecting the event, the event pixel 40 outputs a request for requesting permission of outputting an event signal indicating the occurrence of the event to each of the X arbiter 42 and the Y arbiter 43. Then, the event pixel 40 outputs the event signal to the event signal processing circuit 44 when receiving a response indicating the permission of outputting the event signal from each of the X arbiter 42 and the Y arbiter 43.

The X arbiter 42 and the Y arbiter 43 arbitrate the request for requesting the output of the event signal supplied from each of the plurality of event pixels 40, and transmit a response based on the arbitration result (permission/non-permission of the output of the event signal) and a reset signal for resetting event detection to the event pixel 40 that has output the request.

The event signal processing circuit 44 performs predetermined signal processing on the event signal input from the event pixel 40, and generates and outputs the event data.

As described above, the change in the photocurrent generated in the event pixel 40 can also be regarded as a light amount change (a luminance change) of the light incident on the photoelectric conversion unit of the event pixel 40. Therefore, it can also be said that the event is the light amount change (the luminance change) of the event pixel 40 exceeding the predetermined threshold value. The event data indicating the occurrence of the event includes at least position information such as coordinates indicating the position of the event pixel 40 where the light amount change as the event has occurred. The event data can include the polarity of the light amount change in addition to the position information.

Regarding a series of event data output at a timing when the event occurs from the event pixel 40, as long as an interval between pieces of event data is maintained as it is at the time of event occurrence, it can be said that the event data implicitly includes time information indicating a relative time when the event occurs.

However, when the interval between the pieces of event data is not maintained as it is at the time of event occurrence due to the event data being stored in the memory or the like, the time information implicitly included in the event data is lost. Therefore, before the interval between the pieces of event data is not maintained as it is at the time of the event occurrence, the event signal processing circuit 44 may include the time information indicating the relative time when the event has occurred, such as a time stamp, in the event data.

(Other Configurations)

The system control circuit 45 includes a timing generator or the like configured to generate various timing signals, and the like, and performs drive control of the X arbiter 42, the Y arbiter 43, the event signal processing circuit 44, and the like based on various timings generated by the timing generator.

The output I/F 46 sequentially outputs, as an event stream, a pieces of event data output on a row-by-row basis from the event signal processing circuit 44 to the signal processing unit 123. On the other hand, the signal processing unit 123 generates image data (also referred to as frame data) of a predetermined frame rate by accumulating the event data input as the event stream for a predetermined frame period.

Figure 5:
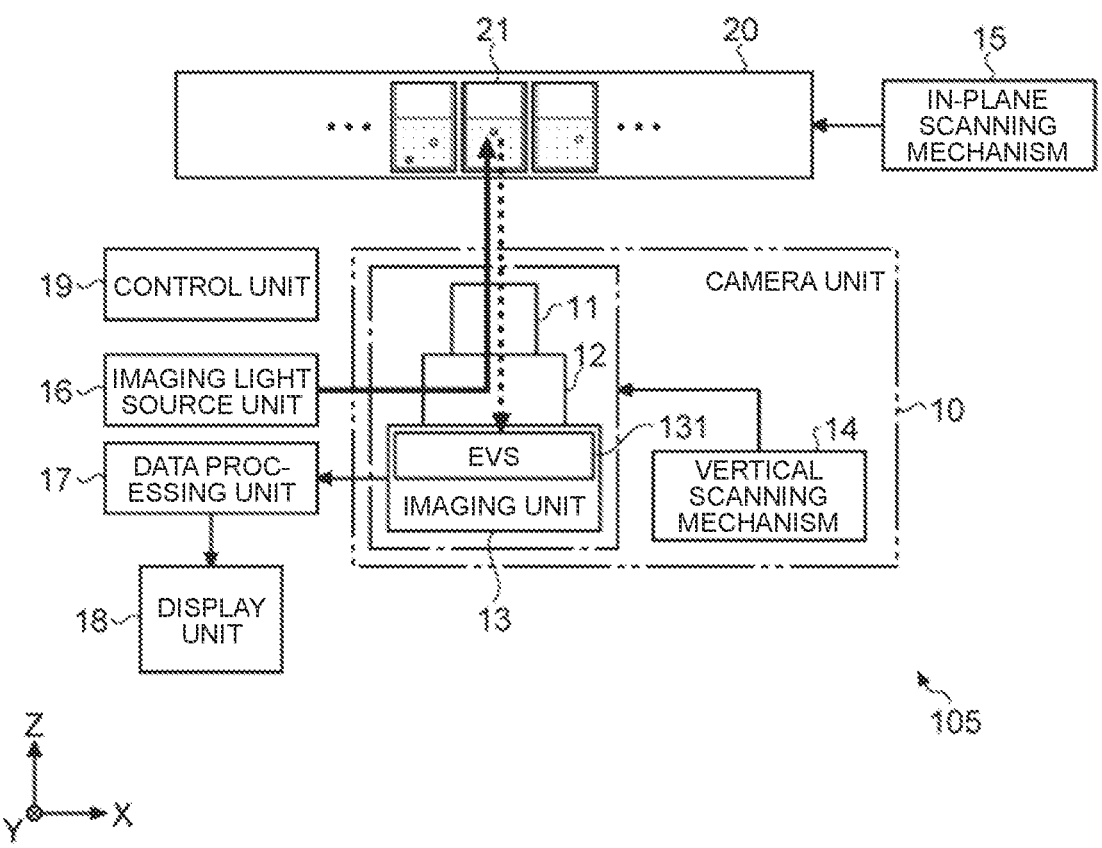
FIG. 5 is a block diagram illustrating a schematic configuration example of a measurement unit for the number of particles according to the first embodiment.

3.4 Schematic Configuration Example of Measurement Unit for the Number of Particles Next, a schematic configuration example of the measurement unit for the number of particles 105 according to the present embodiment will be described. FIG. 5 is a block diagram illustrating a schematic configuration example of the measurement unit for the number of particles according to the present embodiment. As illustrated in FIG. 5, the measurement unit for the number of particles 105 includes a camera unit 10, an in-plane scanning mechanism 15, an imaging light source unit 16, a data processing unit 17, a display unit 18, and a control unit 19.

(Imaging Light Source Unit 16)

The imaging light source unit 16 outputs excitation light for exciting the biological particle P sorted into each well of the well plate 20, similarly to the detection light source unit 111 in FIG. 2.

(Camera Unit 10)

The camera unit 10 includes an objective lens 11, a beam splitter 12, an imaging unit 13, and a vertical scanning mechanism 14.

The beam splitter 12 includes, for example, a spectral beam splitter that reflects light of a specific wavelength band and transmits light of another specific wavelength band, such as a dichroic mirror, reflects the excitation light output from the imaging light source unit 16, and transmits fluorescence emitted from the biological particle P in the well irradiated with the excitation light.

The objective lens 11 includes, for example, one or more lenses and a lens barrel holding the lenses. The objective lens 11 collects the excitation light reflected by the beam splitter 12 so as to irradiate the one entire well to be observed in the well plate 20. The objective lens 11 also has a function as an image forming lens that forms an image of the fluorescence emitted from the biological particle P in the well irradiated with the excitation light on a light receiving surface of the imaging unit 13. However, in a case where the beam splitter 12 or the imaging unit 13 includes an image forming lens that forms a fluorescent image, the objective lens 11 may not have a function as the image forming lens.

The vertical scanning mechanism 14 is a scanning unit that scans the focal position of the objective lens 11 in the Z direction, that is, in the depth direction of each well in the well plate 20. The vertical scanning mechanism 14 may scan the focal position of the objective lens 11 in the depth direction of the well by moving the objective lens 11 in the Z direction, may scan the focal position of the objective lens 11 in the depth direction of the well by moving the entire structure (or a plate on which the structure is fixed) including the objective lens 11, the beam splitter 12, and the imaging unit 13 in the Z direction, or may scan the focal position of the objective lens 11 in the depth direction of the well by moving one or more of the one or more lenses constituting the objective lens 11. In addition, the vertical scanning mechanism 14 may scan the focal position of the objective lens 11 from the bottom surface side of the well toward the top surface side thereof, or may scan the focal position from the top surface side of the well toward the bottom surface side thereof.

It is noted that in a period during which the vertical scanning mechanism 14 scans the focal position of the objective lens 11 in the Z direction, the focal position of the objective lens 11 is recorded in a storage unit such as a memory (not illustrated) at two or more different time points. Here, the focal position of the objective lens 11 may be recorded at predetermined time intervals, and at that time, may be recorded together with a recording time (a time stamp or the like). By using the recorded focal position of the objective lens 11, it is possible to estimate the focal position at which the event data is detected based on the elapsed time from the start of scanning and the time stamp included in the event data. Accordingly, it is also possible to construct a more accurate 3D map. Furthermore, in a case where the speed at which the vertical scanning mechanism 14 scans the focal position of the objective lens 11 in the Z direction is determined in advance, the focal position can also be estimated based on the elapsed time from the start of scanning.

The imaging unit 13 includes an EVS 131. The image of the fluorescence emitted from the biological particle P in the well is formed on a light receiving surface of the EVS 131. For example, the EVS 131 may have a configuration similar to that of the EVS 122b illustrated in FIG. 4.

(In-Plane Scanning Mechanism 15)

The in-plane scanning mechanism 15 is a scanning mechanism for sequentially replacing wells located on the optical axis of the objective lens 11 in the well plate 20, that is, wells to be observed. For example, the in-plane scanning mechanism 15 horizontally moves the well plate 20 by one well in the XY plane to sequentially replace wells located on the optical axis of the objective lens 11. However, the present invention is not limited thereto, and the in-plane scanning mechanism 15 may be provided in the camera unit 10, and a structure (which may include the imaging light source unit 16) including the objective lens 11, the beam splitter 12, and the imaging unit 13 may be horizontally moved such that the wells located on the optical axis of the objective lens 11 are sequentially replaced.

(Data Processing Unit 17)

For example, the data processing unit 17 constructs a 3D map in which the event is mapped in a three-dimensional space including a pixel coordinate axis and an event occurrence time axis from the event stream input from the imaging unit 13 along with vertical scanning of the focal plane of the objective lens 11. Then, the data processing unit 17 measures the number of biological particles P sorted into each well based on the constructed 3D map. At that time, the data processing unit 17 may specify the position of the biological particle P in each well. For example, the data processing unit 17 may detect the number of biological particles P in each well and the position thereof by converting the time axis in the constructed 3D map to the position in the Z direction and generating three-dimensional space coordinates of each well.

In addition, the data processing unit 17 may generate a user interface (hereinafter, also simply referred to as a UI) that presents, to the user, how many biological particles P are sorted into each well of the well plate 20, where the biological particle P exists in each well, and the like based on the measured number of biological particles P and the position thereof, and display the generated user interface on the display unit 18.

(Display Unit 18)

The display unit 18 includes, for example, a display, and displays the UI generated by the data processing unit 17 to the user. In addition, the display unit 18 may display the three-dimensional map of each well generated by the data processing unit 17.

It is noted that the display unit 18 may be a display unit such as a smartphone, a tablet terminal, or a personal computer instead of the display. In that case, the data processing unit 17 and the display unit 18 may include a communication unit for performing communication via a predetermined network.

(Control Unit 19)

The control unit 19 includes, for example, an information processing apparatus such as a central processing unit (CPU), and comprehensively controls operation of each unit of the measurement unit for the number of particles 105.

3.5 Configuration Example of Well Plate and Well

Figure 6:
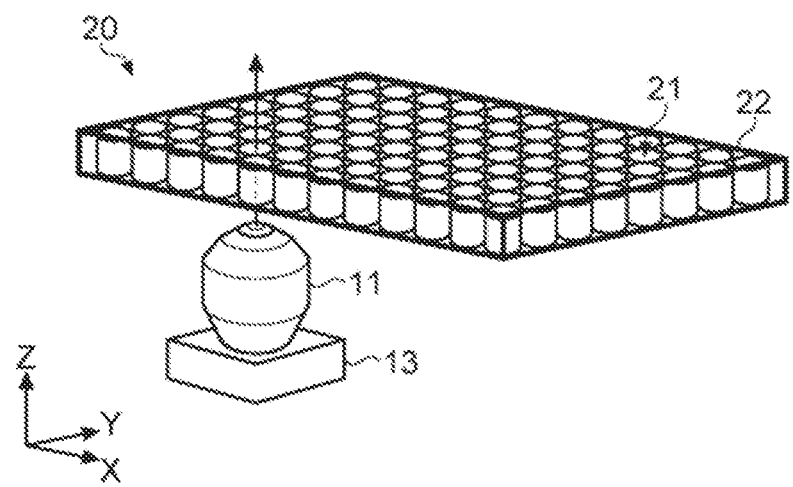
FIG. 6 is a diagram illustrating a configuration example of a well plate according to the first embodiment.
Figure 7:
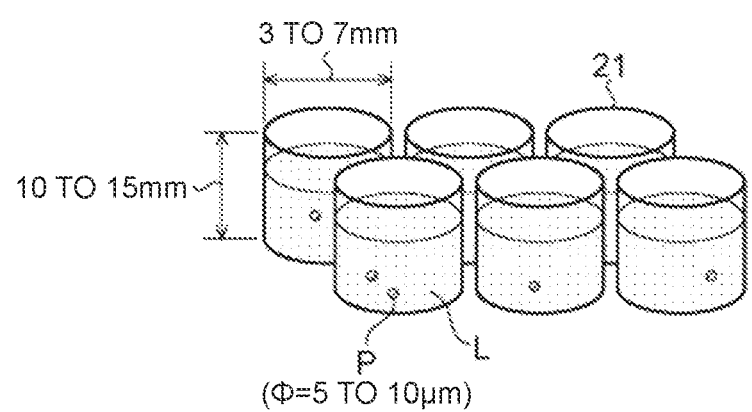
FIG. 7 is a diagram illustrating a part of the well plate illustrated in FIG. 6.

Next, the well plate and the well according to the present embodiment will be described. FIG. 6 is a diagram illustrating a configuration example of the well plate according to the present embodiment. FIG. 7 is a diagram illustrating a part of the well plate illustrated in FIG. 6.

As illustrated in FIG. 6, the well plate 20 has a configuration in which a well 21, which is a container that sorts the biological particle P, the fall trajectory of which is changed by the sorting unit 104, is held by a frame 22 in a state of being arranged in a matrix. The opening shape and/or the horizontal cross-sectional shape of each well 21 may be a circle, an ellipse, or a polygon such as a triangle, a quadrangle, or a hexagon. For example, 96 well plates or 384 well plates may be used. In addition, a container used to sort the biological particle P is not limited to the well, and a droplet left standing on the plate may be used as a container that sorts the biological particle P.

Each well 21 is configured using a member transparent to the excitation light emitted from the imaging light source unit 16 to be described later and the fluorescence emitted from the biological particle P. In the case of the configuration in which the entire bottom surface of each well 21 is supported by the frame 22, the bottom portion of the frame 22 supporting each well 212 may also be configured by a member transparent to the excitation light and the fluorescence.

In FIGS. 5 and 6 and the following description, a case in which the excitation light is emitted from the bottom surface side of each well 21 (however, the beam splitter 12 is omitted) is exemplified, but the present invention is not limited thereto. For example, the excitation light may be emitted from the opening side (the upper side) of each well 21. In that case, the beam splitter 12 in the camera unit 10 may be omitted.

In addition, as illustrated in FIG. 7, each well 21 has, for example, an opening of about 3 to 7 mm in order to secure the sorting accuracy of the biological particle P, the fall trajectory of which is controlled by the sorting unit 104. In addition, each well 21 has a depth of about 10 to 15 mm in order to sufficiently reduce an impact applied to the biological particle P at the time of collection. It is noted that, in each well 21, a predetermined liquid (for example, a sheath liquid) may be stored in advance in order to mitigate the impact at the time of collecting the biological particle P and keep freshness of the collected biological particle P.

3.6 Regarding Measurement of the Number of Biological Particles

Next, the measurement of the number of the biological particles P by the measurement unit for the number of particles 105 according to the present embodiment, that is, a confirmation operation of whether the biological particles P are correctly sorted into the respective wells 21 of the well plate 20 will be described.

Figure 8:
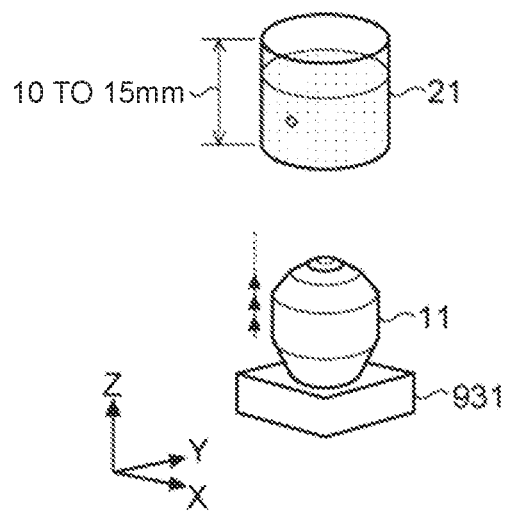
FIG. 8 is a diagram illustrating a case of measuring a biological particle sorted into each well using a frame-type image sensor.
Figure 9:
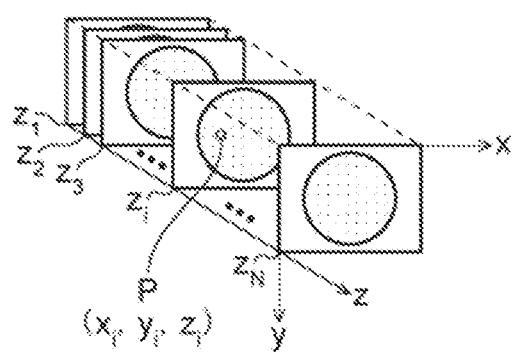
FIG. 9 is a diagram illustrating an example of image data acquired in the case illustrated in FIG. 8.
Figure 10:
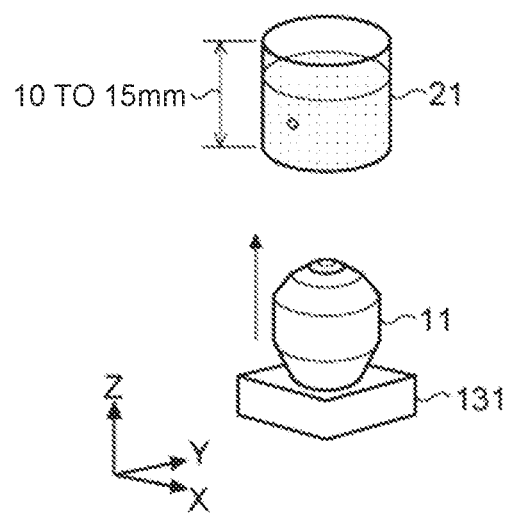
FIG. 10 is a diagram illustrating a case of measuring the biological particle sorted into each well using the EVS according to the first embodiment.
Figure 11:
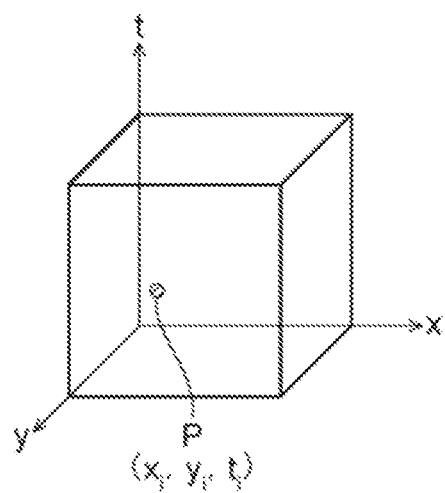
FIG. 11 is a diagram illustrating an example of a three-dimensional map (hereinafter, also referred to as a 3D map) constructed in the case illustrated in FIG. 10.

FIG. 8 is a diagram illustrating a case in which the biological particle sorted into each well is measured using the frame-type image sensor, and FIG. 9 is a diagram illustrating an example of image data acquired in the case illustrated in FIG. 8. Furthermore, FIG. 10 is a diagram illustrating a case of measuring the biological particle sorted into each well using the EVS, and FIG. 11 is a diagram illustrating an example of a three-dimensional map (hereinafter, also referred to as a 3D map) configured in the case illustrated in FIG. 10.

As illustrated in FIG. 8, in a case where a frame-type image sensor 931 is used, it is necessary to synchronize a frame acquisition timing with a focal depth interval of scanning. Therefore, a scanning mechanism having high speed and high positional accuracy, such as a stepping motor including a built-in position sensor, is required, and as such problems such as an increase in device cost and an increase in device size occur.

In addition, it is possible to perform inspection at a faster focal plane scanning speed than in the case of visual observation, but imaging having the number of pixels of 1 million or more, which is necessary to fit, to the angle of view, the entire horizontal cross section of the well 21 having a diameter of several mm with a resolution capable of detecting the biological particle P having a diameter of several macrometers, is performed over a depth of several tens of mm in units of the focal depth of about 0.1 mm. For example, in a case where the diameter of the well 21 is 3 to 7 mm and the depth is 10 to 15 mm, it is necessary to perform the imaging with the number of pixels of 1 million or more a hundred to a hundred and several tens of times. Therefore, for example, even in a case where pixel gradation is assumed to be 8 bits, a total data amount of image data that needs to be acquired and transferred becomes an enormous data amount of about 800 Mbits (megabits), and as such it takes a long time of about several seconds to acquire and transfer the image data.

Furthermore, as illustrated in FIG. 9, it is necessary to detect the number and positions of the biological particles P in the well 21 by analyzing one hundred to one hundred and several tens of pieces of image data obtained by slicing the well 21 in units of approximately 0.1 mm in the Z direction (the depth direction). Therefore, there is a problem in that the amount of data to be analyzed becomes enormous, and as a result, the time required for image analysis becomes long.

On the other hand, as illustrated in FIG. 10, in the case of using the EVS 131, the vertical scanning mechanism 14 scans the focal position of the objective lens 11 at any speed that is not necessarily constant with respect to the depth direction of the well 21. As described above, when the focal position of the objective lens 11 is scanned in the depth direction of the well 21 to be observed using the vertical scanning mechanism 14, the fluorescent image of the biological particle P formed on the light receiving surface of the EVS 131 does not have luminance enough to confirm the presence in a state where the focal position is away from the biological particle P, and changes from a blurred state to a clear state as the focal position approaches the biological particle P. Thereafter, the fluorescent image becomes the clearest state in a state where the focal position coincides with the biological particle P. Then, as the focal position moves away from the biological particle P, the state changes from the clear state to the blurred state, and when the focal position significantly moves away from the biological particle P, there is no luminance enough to confirm the presence.

Therefore, as illustrated in FIG. 11, by detecting a luminance change during scanning of the vertical scanning mechanism 14 in the depth direction of the well 21 by using the EVS 131 and constructing the 3D map in which a time axis t corresponds to the depth direction in the well 21, it is possible to detect how many biological particles P are present in the well 21. At that time, it is also possible to specify the position in the depth direction of the biological particle P in the well 21 by separately mounting a unit configured to detect and store the scanning position in the depth direction at the occurrence time of the event. An example of the unit configured to detect and store the scanning position includes a position sensor in which reading and recording are performed in conjunction with detection of the event corresponding to the biological particle P. It is noted that the shape on the 3D map of the generated event group corresponding to the fluorescence of the biological particle P obtained by scanning the focal position of the objective lens 11 in the depth direction is an hourglass shape extending in the scanning direction.

As described above, when the light incident on each event pixel 40 increases or decreases, the EVS 131 outputs the event as an event in a synchronous or asynchronous manner. Therefore, by using the EVS 131 as a detection unit of the biological particle P for the reason that the event data is not output from the event pixel 40 in which the luminance change does not occur and that the event data is asynchronously and instantaneously output when the event occurs, it is possible to detect the biological particle P with a faster response with a smaller data transfer amount and data processing amount as compared with the frame-type image sensor.

Furthermore, since there is no need to synchronize a pixel read timing with the vertical scanning position, high position accuracy and high speed control by the vertical scanning mechanism 14 are unnecessary. For example, even when scanning is performed at the liquid depth of 10 mm in a time of about several hundred milliseconds using a simple configuration in which the vertical scanning mechanism 14 simply shifts the camera unit 10 from a start point to an end point of vertical scanning by a spring, the number of biological particles P existing in the well 21 can be accurately measured. As a result, it is possible to reduce the cost and size of the vertical scanning mechanism 14 while shortening the measurement time to about ⅒ as compared with the case of using the frame-type image sensor (for example, several seconds).

3.7 Example of Flow of Operation of Measuring the Number of Particles

Figure 12:
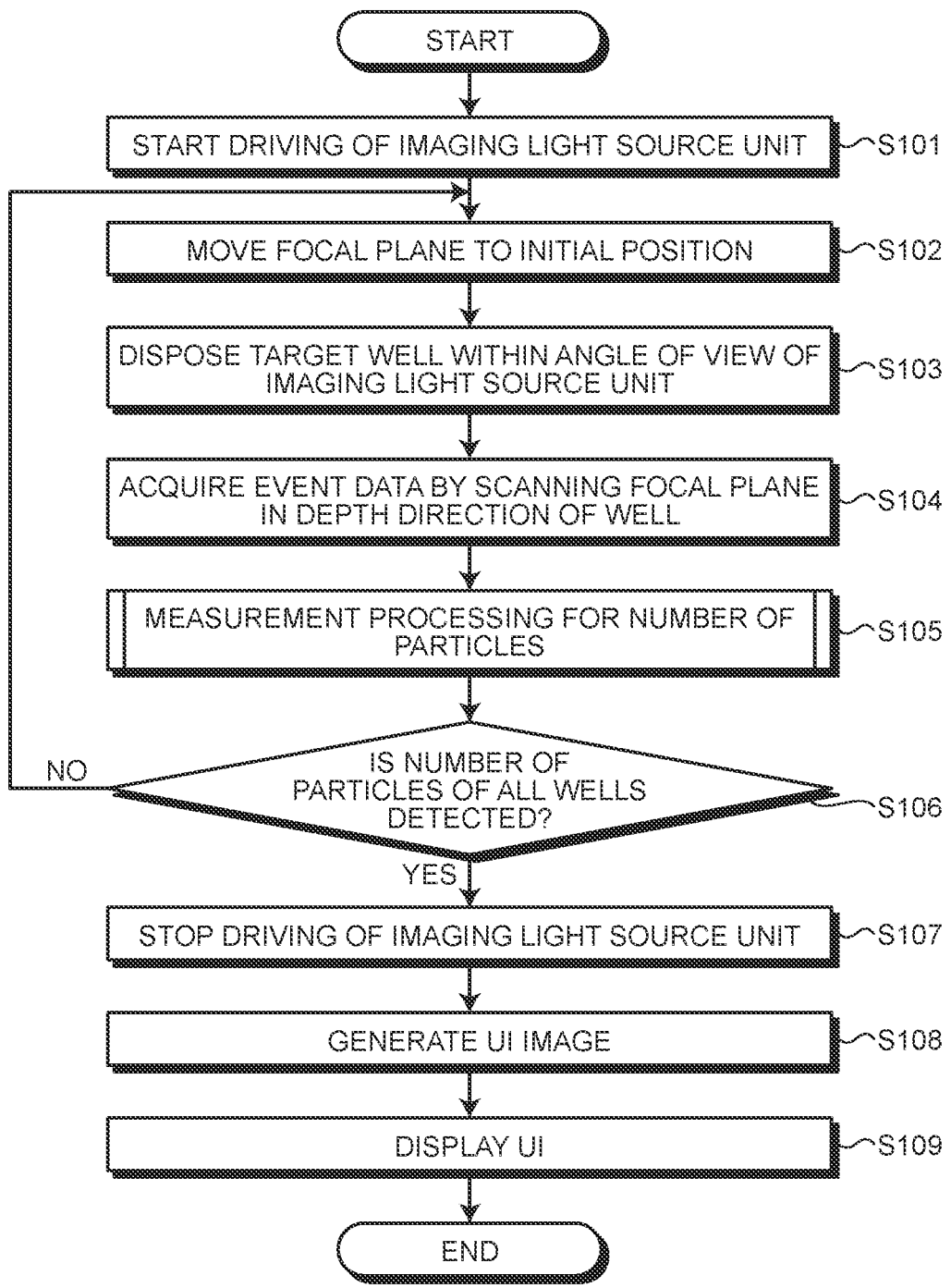
FIG. 12 is a flowchart illustrating an example of a flow of an operation of measuring the number of particles according to the first embodiment.

Next, a description will be given as to an example of a flow of an operation of measuring the number of particles executed by the measurement unit for the number of particles 105 according to the present embodiment. FIG. 12 is a flowchart illustrating an example of the operation of measuring the number of particles according to the present embodiment. It is noted that, since the operation illustrated in FIG. 12 may be integrated by the control unit 19, attention is paid to the operation of the control unit 19 in the following description.

As illustrated in FIG. 12, in the operation of measuring the number of particles according to the present embodiment, first, at the start of measurement, the control unit 19 starts driving of the imaging light source unit 16 (Step S101). As a result, the well plate 20 is irradiated with excitation light output from the imaging light source unit 16 through the objective lens 11. It is noted that the EVS 131 of the imaging unit 13 may be set to the active state at this time point.

Next, the control unit 19 controls the vertical scanning mechanism 14 to move, for example, the focal position (also referred to as the focal plane) of the objective lens 11 to an initial position (Step S102). It is noted that the initial position may be a position corresponding to the bottom surface of the well 21 in a case where the well 21 is scanned from the bottom surface to the top surface, and may be a position corresponding to the top surface of the well 21 in a case where the well 21 is scanned from the top surface to the bottom surface.

Next, the control unit 19 controls the in-plane scanning mechanism 15 to move the well plate 20, thereby arranging the well 21 to be observed within the angle of view of the imaging unit 13 (Step S103). For example, the in-plane scanning mechanism 15 horizontally moves the well plate 20 such that the center of the well 21 to be observed is positioned on the optical axis of the EVS 131. It is noted that, for example, the wells 21 to be observed may be selected in order from the wells 21 located at any of the four corners of the well plate 20.

Next, the control unit 19 controls the vertical scanning mechanism 14 to scan the focal position of the objective lens 11 in the depth direction from the initial position, and acquires event data output from the EVS 131 during the scanning (Step S104). It is noted that the event data output from the EVS 131 is input to the data processing unit 17 and accumulated in a predetermined storage region for each well 21.

Next, the control unit 19 causes the data processing unit 17 to execute the measurement processing for the number of particles of detecting the number of the biological particles P, each of which is sorted into the well 21 and/or the position thereof based on the event data accumulated in association with the well 21 to be observed (Step S105). It is noted that details of the measurement processing for the number of particles will be described later with reference to FIG. 13. Further, in Step S105, the data processing unit 17 may generate a 3D map of each well 21.

Next, the control unit 19 determines whether the measurement processing for the number of particles is completely executed for all the wells 21, each of which serves as a sorting destination of the respective biological particles P, in the well plate 20 (Step S106), and when not completely executed (NO in Step S106), the processing returns to Step S102 and the subsequent operations are executed for the next well 21.

On the other hand, when the measurement processing for the number of particles is executed for all the wells 21, each of which serves as a sorting destination (YES in Step S106), the control unit 19 stops driving the imaging light source unit 16 (Step S107).

Subsequently, the control unit 19 generates a UI for presenting the number of the biological particles P and/or the position thereof for each well 21 to the user based on the number of the biological particles P and the position thereof for each well 21 measured in Step S105 (Step S108), causes the display unit 18 to display the generated UI (Step S109), and then ends this operation.

3.8 Example of Measurement Processing for the Number of Particles

Figure 13:
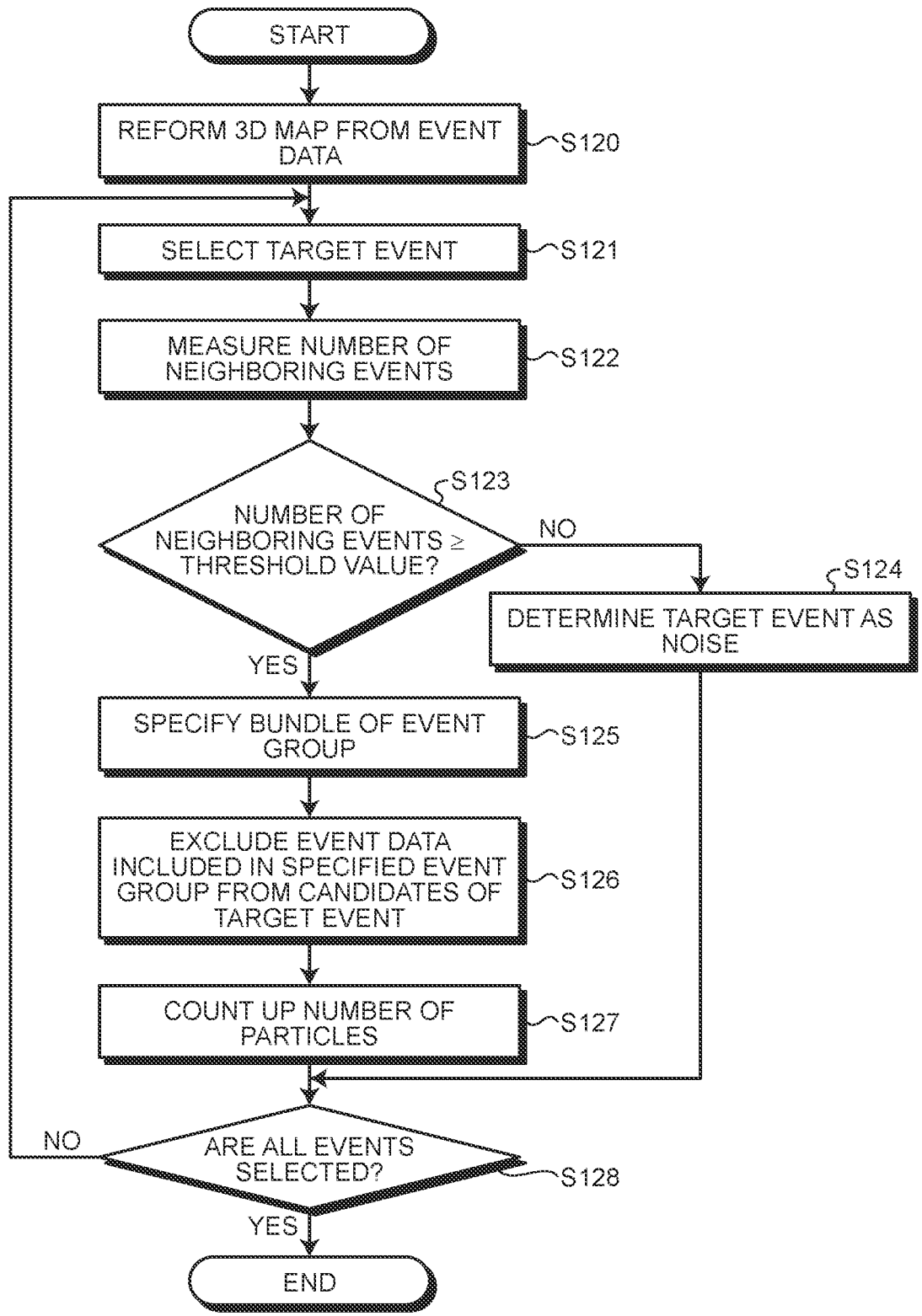
FIG. 13 is a flowchart illustrating an example of measurement processing for the number of particles according to the first embodiment.

Next, an example of the measurement processing for the number of particles indicated in Step S105 of FIG. 12 will be described. FIG. 13 is a flowchart illustrating an example of the measurement processing for the number of particles according to the present embodiment.

As illustrated in FIG. 13, in this operation, the data processing unit 17 first constructs the 3D map (for example, refer to FIG. 11) of the well 21 to be observed from the event data acquired in Step S104 of FIG. 12 (Step S120).

Next, the data processing unit 17 selects one event (a target event) among the pieces of event data included in the 3D map (Step S121). It is noted that the target event may be selected based on, for example, a time stamp, pixel position information, or the like. For example, the target event may be selected in order from the event data with an older time indicated by the time stamp, or the target event may be selected in order from the upper left event pixel 40 in the pixel array unit 41 in the X direction.

Next, the data processing unit 17 measures the number of events occurring in the vicinity of the selected target event (hereinafter, also referred to as a neighboring event) (hereinafter, also referred to as the number of neighboring events) (Step S122). It is noted that the neighboring event may be, for example, an event positioned nearby in the X-axis direction and the Y-axis direction (that is, in the XY plane), or may be an event positioned nearby in the X-axis direction, the Y-axis direction, and the t-axis direction (that is, in the XYt space). Furthermore, the vicinity may be a region within a predetermined pixel (for example, 5 pixels) in the X-axis direction and the Y-axis direction with the event pixel 40 that has detected the target event as a reference as long as the region is on the XY plane, and may be a range within a predetermined time (for example, several tens of microseconds) from the time indicated by the time stamp of the target event as long as the region is on the t-axis.

Next, in order to determine whether the target event is noise, the data processing unit 17 determines whether the number of neighboring events measured in Step S122 is equal to or greater than a preset threshold value (Step S122). When the number of neighboring events is less than the threshold value (NO in Step S122), the data processing unit 17 determines that the target event is noise (Step S124), and proceeds to Step S128.

On the other hand, when the number of neighboring events is equal to or greater than the threshold value (YES in Step S122), the data processing unit 17 determines that the neighboring event is the event to be measured derived from the biological particle P. In order to specify a group of event data in which the same biological particle P is detected, a bundle of event group including the target event can be specified from the accumulated event data or the 3D map constructed by the event data (Step S125).

Next, in order to prevent the duplicate counting of the same biological particle P, the data processing unit 17 excludes the event data included in the event group specified in Step S125 from candidates of the target event in Step S121 (Step S126).

Thereafter, the data processing unit 17 counts up the number of biological particles P with respect to the well 21 to be observed (Step S127), and proceeds to Step S128. At that time, the data processing unit 17 may specify the position of the center or the center of gravity of the distribution range specified as the bundle of event group in Step S125, that is, the event group corresponding to one biological particle P as the position of the biological particle P in the well 21 to be observed.

It is noted that, in Step S127, the position of the biological particle P in the well 21 to be observed may be measured instead of counting the number of the biological particles P with respect to the well 21 to be observed. At that time, when two or more biological particles P are present in the well 21, the position of each biological particle P may be measured.

In Step S128, the data processing unit 17 determines whether all the pieces of event data (however, excluded event data is excluded) included in the 3D map are completely selected as the target event in Step S121, and in a case where all the pieces of event data are completely selected (YES in Step S128), this operation is ended. As a result, the operation of measuring the number of particles illustrated in FIG. 12 proceeds to the next Step S106. On the other hand, in a case where there is unselected event data (NO in Step S128), the data processing unit 17 returns to Step S121, selects the unselected event data as the target event, and executes subsequent operations.

It is noted that, in Steps S123 and S124 of FIG. 13, a description has been given as to a case in which, when the number of pieces of event data positioned in the vicinity of the target event is equal to or less than the predetermined threshold value (NO in Step S123), in other words, when the target event is an independent event, it is determined that the target event is randomly generated noise (Step S124). However, the determination as to whether the target event is based on the biological particle P or noise is not limited to the above-described method, and various modifications may be made. For example, in a case where the distribution shape of the event data distributed with a certain degree of unity has a predetermined shape (for example, a shape like an hourglass), the event data belonging to the event group may be determined to be the event data in which the biological particle P is detected, and the other event data may be determined to be noise.

In addition, the measurement processing for the number of particles executed for each well 21 may be executed every time each well 21 is vertically scanned, or may be collectively executed for all the wells 21 after the vertical scanning for all the wells 21 is completed.

3.9 Specific Example of Measurement Processing for the Number of Particles

Figure 14A:
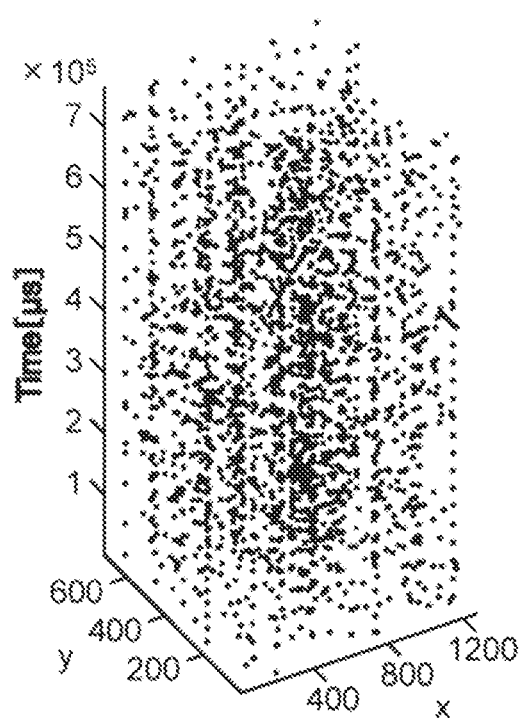
FIGS. 14A and 14B are diagrams illustrating the number of particles measured by the measurement processing for the number of particles according to the first embodiment (the number of particles=0).
Figure 14B:
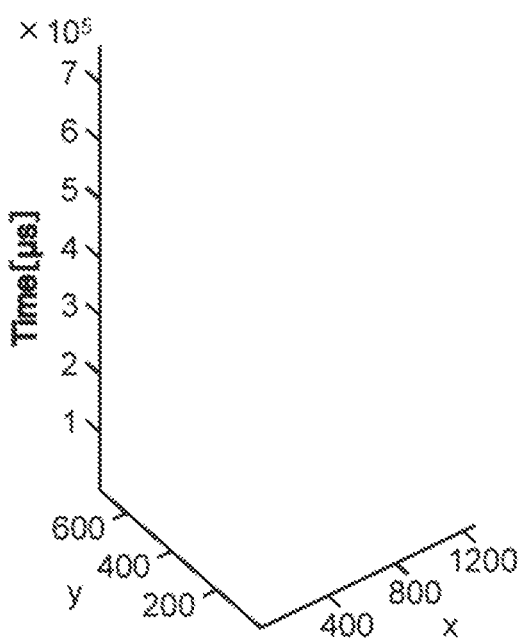
Figure 15A:
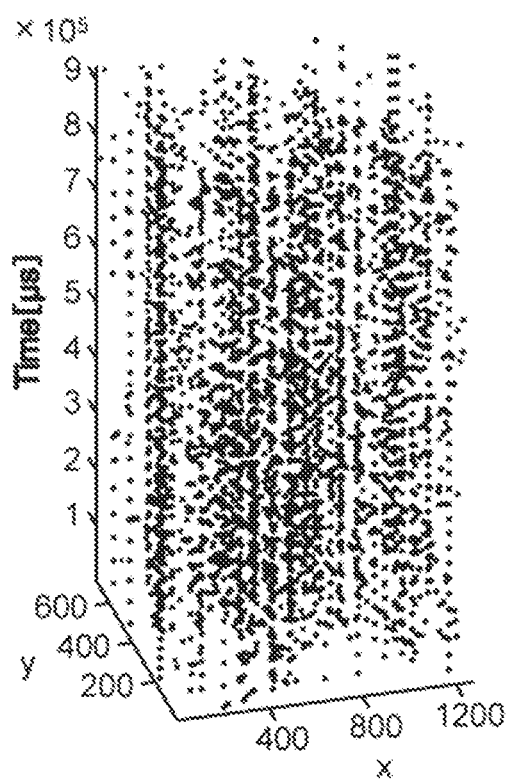
FIGS. 15A and 15B are diagrams illustrating the number of particles measured by the measurement processing for the number of particles according to the first embodiment (the number of particles=1).
Figure 15B:
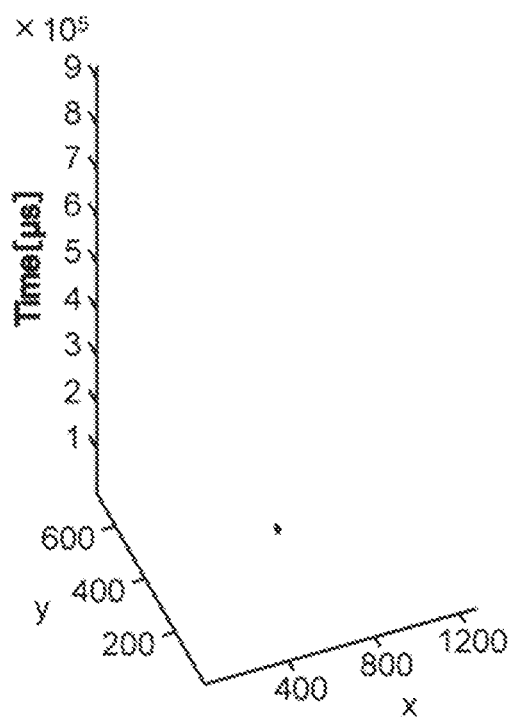
Figure 16A:
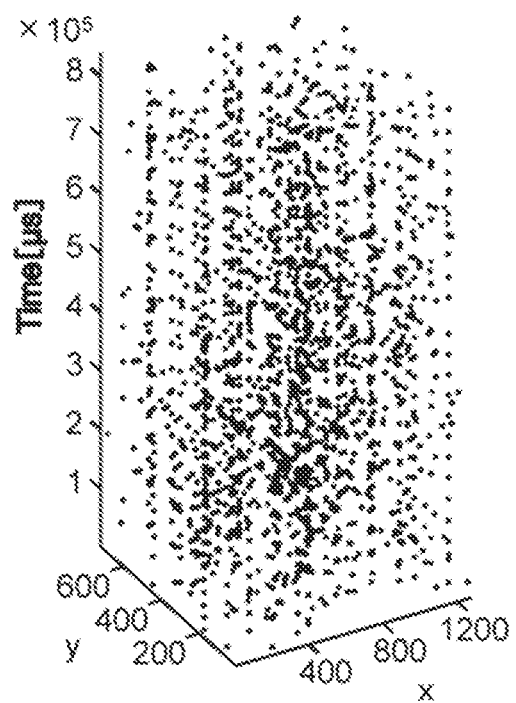
FIGS. 16A and 16B are diagrams illustrating the number of particles measured by the measurement processing for the number of particles according to the first embodiment (the number of particles=2).
Figure 16B:
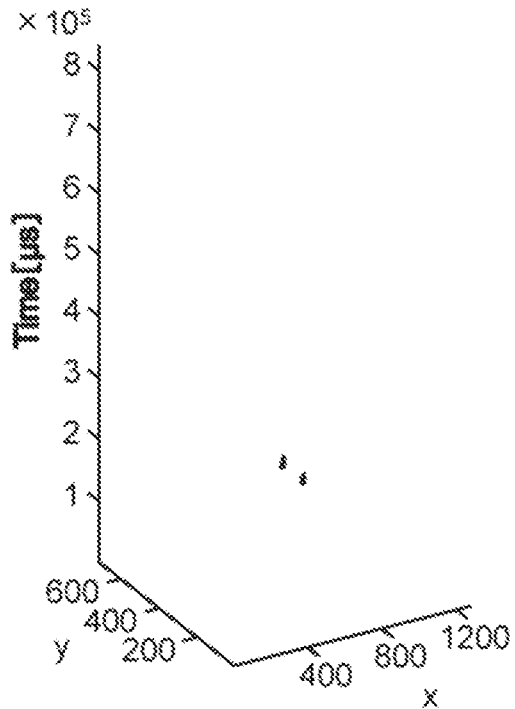

FIGS. 14A, 14B, 15A, 15B, 16A, and 16B are diagrams illustrating the number of particles measured by the measurement processing for the number of particles according to the present embodiment, FIGS. 14A and 14B illustrates a case in which the biological particle P is not sorted into the well 21, FIGS. 15A and 15B illustrate a case in which one biological particle P is sorted into the well 21, and FIGS. 16A and 16B illustrate a case in which two biological particles P are sorted into the well 21. Further, FIGS. 14A, 15A, and 16A are 3D map indicating all the event data output from the EVS 131, and FIGS. 14B, 15B, and 16B are 3D map indicating the biological particle P extracted from the 3D map of the event data illustrated in FIGS. 14A, 15A, and 16A. It is noted that, in FIGS. 14A, 14B, 15A, 15B, 16A, and 16B, the in-plane axes X and Y are pixel coordinates of the sensor, and the vertical axis Time is an event occurrence time.

Under each condition where the number of biological particles P is 0, 1, and 2, as illustrated in FIGS. 14A, 15A, and 16A, there are a large number of events before noise removal. However, as illustrated in FIGS. 14B, 15B, and 16B, after noise removal to which determination based on a threshold value of the number of neighboring events is applied, only the event group corresponding to the biological particles P is obtained, and as such the number of particles can be measured.

It is noted that, in FIGS. 14A, 14B, 15A, 15B, 16A, and 16B, a case where an event in which the number of neighboring events existing in a range within 5 pixels in the XY plane and within 10 ms in the time axis (Z axis) direction is 5 or less is determined as noise is exemplified, but the invention is not limited thereto, and other setting ranges and threshold values may be used, and methods other than the neighborhood search may be used.

3.10 Specific Example of User Interface

Figure 17:
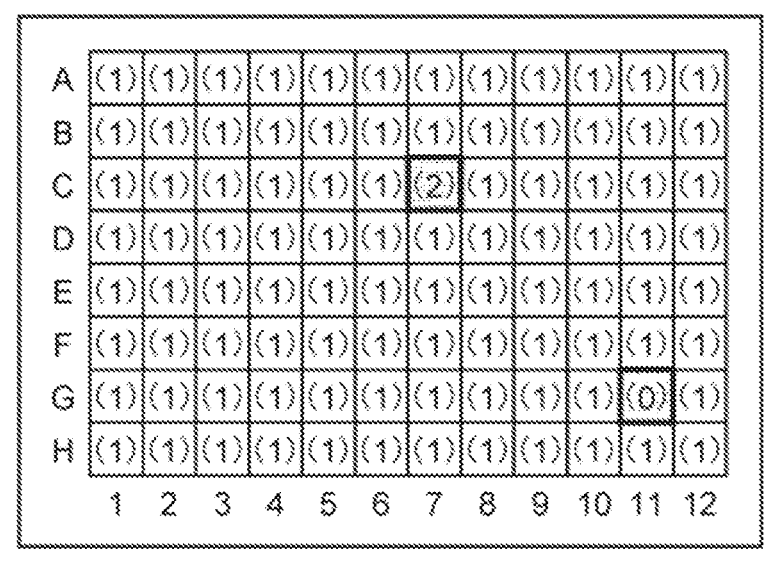

FIG. 17 is a diagram illustrating an example of the UI presented to the user in Step S109 of FIG. 12. As illustrated in FIG. 17, in the UI, for example, the square corresponding to each well 21 of the well plate 20 is arranged according to the arrangement of the wells 21 in the well plate 20. An index (A to H, 1 to 12) for identifying each row and each column may be allocated to this array.

In each square, the number of biological particles P respectively sorted into the corresponding wells 21 is displayed. At this time, a square that does not meet a specific number (one in this example) or a square that exceeds the specific number may be highlighted using a visual effect such as color, blinking, or bold.

In addition, information indicating the position of the biological particle P in the well 21 may be displayed on each square. For example, the position corresponding to the position in the XY plane of the biological particle P in the well 21 may be displayed by a dot or the like in the square. Alternatively, a two-dimensional map (hereinafter, also referred to as a 2D map) or the 3D map of the well 21 corresponding to the square selected by a user using an input interface such as a mouse, a keyboard, or a touch panel may be displayed to the user by switching a screen or a window, a new window, or the like. It is noted that the 2D map may be image data of the XY plane where the biological particle P exists in the 3D map, or may be image data generated from the 3D map constructed from the event data.

3.11 Apparatus Form of Particle Analysis System

Figure 18:
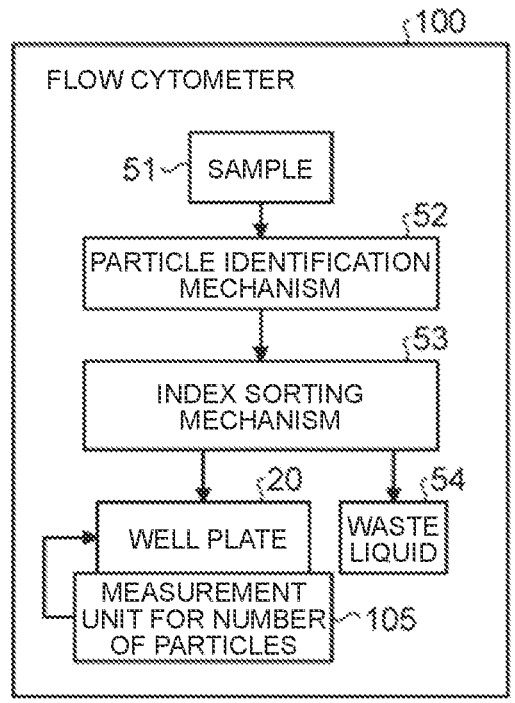
FIG. 18 is a block diagram illustrating an apparatus form example of the particle analysis system according to the first embodiment.
Figure 19:
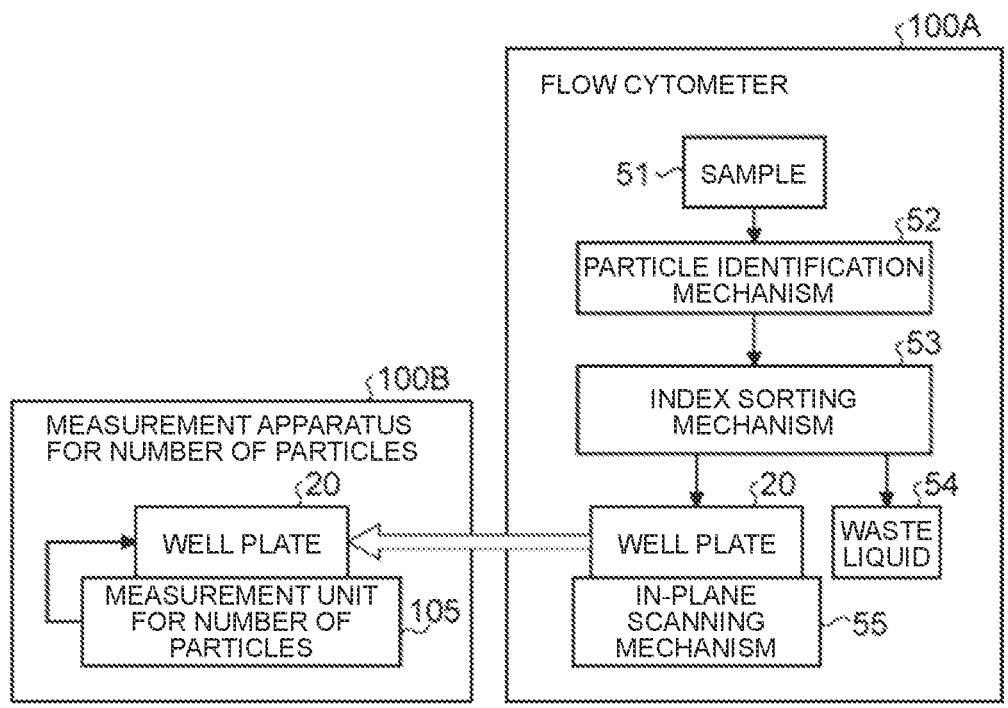
FIG. 19 is a block diagram illustrating another apparatus form example of the particle analysis system according to the first embodiment.

As an apparatus form of the particle analysis system 100 according to the present embodiment, as shown in FIG. 18, the apparatus may be an integrated type including a particle identification mechanism 52 (for example, corresponding to the light irradiation unit 101, the detection unit 102, and the information processing unit 103 in FIG. 2), an index sorting mechanism 53 (for example, corresponding to the sorting unit 104 in FIG. 2), and a mechanism that stores or discards a waste liquid 54 at the time of sorting the biological particle P, in which the measurement unit for the number of particles 105 is incorporated in a sorter-type flow cytometer (corresponding to a flow cytometer 100A in FIG. 19) that analyzes and sorts a sample 51 containing the biological particle P, or may be a separate type, as illustrated in FIG. 19, in which a measurement apparatus for the number of particles 100B including the measurement unit for the number of particles 105 is provided separately from the sorter-type flow cytometer 100A.

In the case of the integrated type illustrated in FIG. 18, an in-plane scanning mechanism 55 that moves the well plate 20 for index sorting may be used as it is as the in-plane scanning mechanism 15 of the measurement unit for the number of particles 105. On the other hand, in the case of the separate type illustrated in FIG. 19, the well plate 20 subjected to index sorting is taken out from the flow cytometer 100A and placed on the measurement apparatus for the number of particles 100B, whereby the counting of the biological particle P sorted into each well 21 is executed.

3.12 Action and Effect

As described above, according to the present embodiment, photographing by the camera is effective in order to measure the number of biological particles P suspended in the liquid filled in the well 21 in a non-contact manner. However, in a case where the depth of the liquid is larger than the focal depth of the camera, it is necessary to scan the focal plane of the camera in the depth direction of the container in order to measure the number of particles without omission. At that time, as in the present embodiment, by using the EVS 131, which is an event-type image sensor, instead of the frame-type image sensor, scanning in the depth direction can be performed continuously and at a high speed. Accordingly, since the number of sorted particles can be accurately measured in a shorter time, damage to the biological particle P can be minimized. In addition, the apparatus can be downsized and reduced in cost by simplifying the scanning mechanism in the depth direction.

3.13 Modification

Next, modifications of the above-described embodiment will be described with some examples.

3.13.1 First Modification

Figure 20:
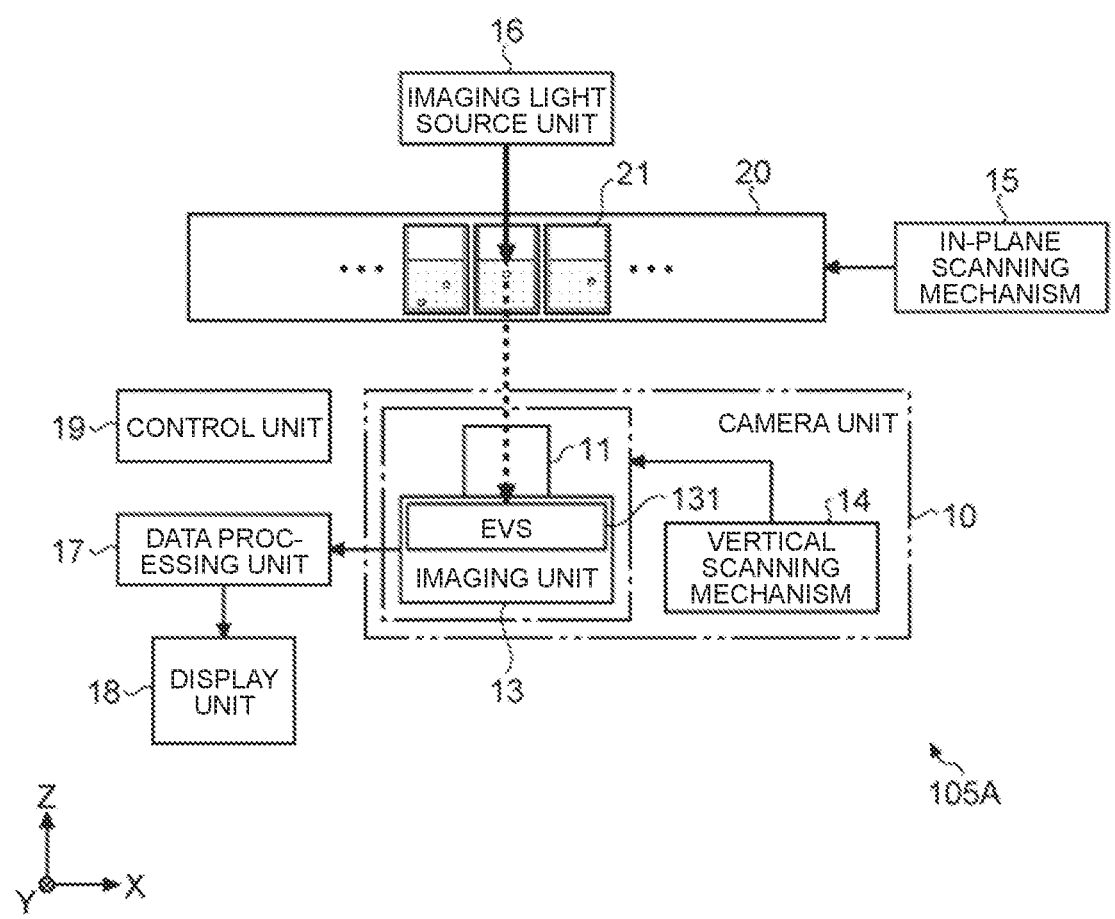
FIG. 20 is a block diagram illustrating a schematic configuration example of a measurement unit for the number of particles according to a first modification of the first embodiment.

FIG. 20 is a block diagram illustrating a schematic configuration example of a measurement unit for the number of particles according to a first modification of the present embodiment. As illustrated in FIG. 20, in a measurement unit for the number of particles 105A according to the present modification, in the same configuration as the measurement unit for the number of particles 105 described with reference to FIG. 5 according to the first embodiment, the imaging light source unit 16 is configured to illuminate the well 21 from above. In addition, the beam splitter 12 in the camera unit 10 is omitted along with the change of the illumination direction.

As described above, by imaging the well 21 from the side (in this example, the bottom surface side) opposite to the side (in this example, the upper side) on which the well 21 is illuminated, the beam splitter 12 for separating the excitation light for exciting the biological particle P and the fluorescence emitted from the biological particle P can be omitted, so that the configuration of the camera unit 10 can be further simplified.

Other configurations, operations, and effects may be similar to those of the above-described embodiment, and thus detailed description thereof is omitted here.

3.13.2 Second Modification

Figure 21:
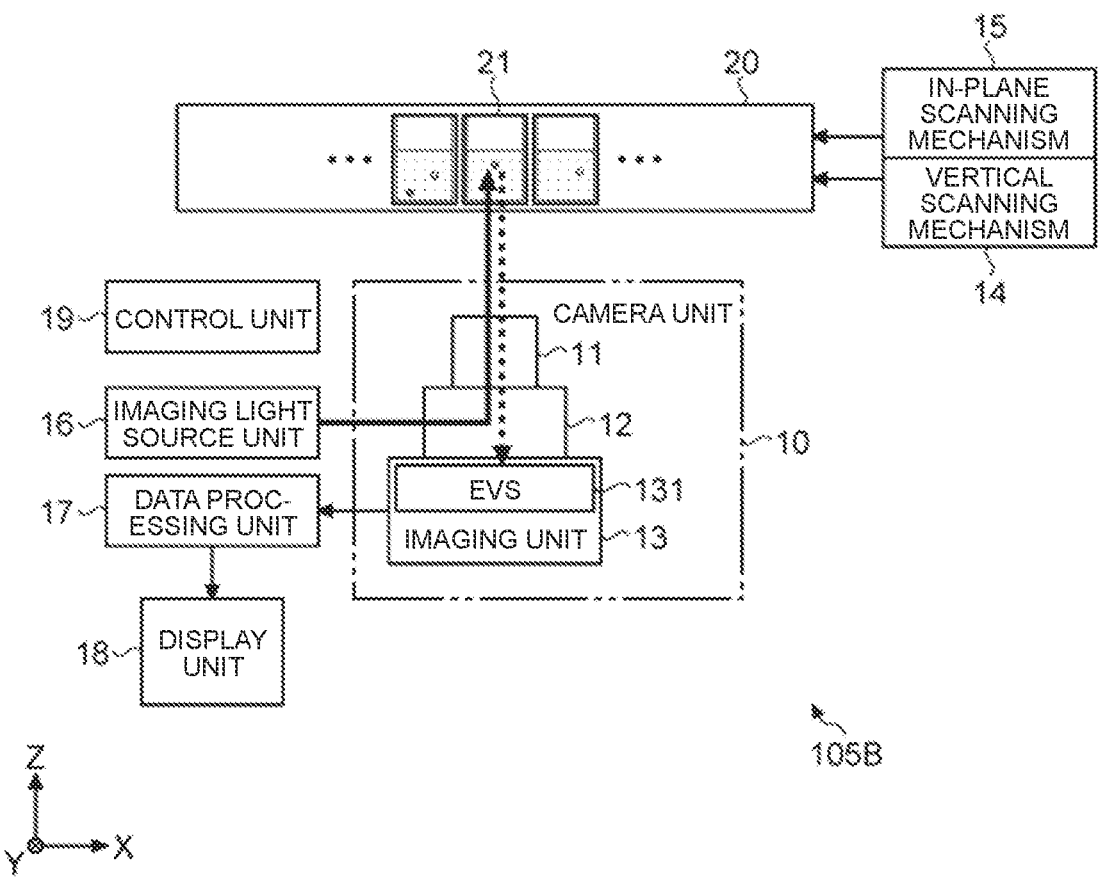
FIG. 21 is a block diagram illustrating a schematic configuration example of a measurement unit for the number of particles according to a second modification of the first embodiment.

FIG. 21 is a block diagram illustrating a schematic configuration example of a measurement unit for the number of particles according to a second modification of the present embodiment. As illustrated in FIG. 21, a measurement unit for the number of particles 105B according to the present modification is configured such that the vertical scanning mechanism 14 scans the well plate 20 in the depth direction in the same configuration as the measurement unit for the number of particles 105 according to the first embodiment.

As described above, the configuration in which the focal position of the objective lens 11 is scanned in the depth direction may be variously modified as long as a relative position between the objective lens 11 and the well plate 20 is changed in the depth direction. As in the present modification, by vertically scanning the well plate 20, a simpler scanning mechanism can be used as compared with the case of vertically scanning the camera unit 10 side, and as such further miniaturization and cost reduction of the apparatus can be achieved.

Other configurations, operations, and effects may be similar to those of the above-described embodiment or the modification thereof, and thus detailed description thereof is omitted here.

3.13.3 Other Modifications

In addition, in the above-described embodiment and the modifications thereof, the case of measuring the number of the biological particles P sorted into the respective wells 21 and the position thereof by observing the fluorescence emitted from the biological particle P using the EVS 131 has been exemplified, but the present invention is not limited to such a configuration. For example, by inspecting reflected light and scattered light of the light output from the imaging light source unit 16 using the EVS 131, it is possible to measure the number of the biological particles P sorted into the respective wells 21 and the position thereof. In that case, in a configuration in which the well 21 is imaged from the same side as the side illuminating the well 21, a half mirror or the like may be used as the beam splitter 12 instead of the spectral beam splitter.

4. Second Embodiment

Next, a particle analysis system, a particle analysis method, and a flow cytometer system according to a second embodiment of the present disclosure will be described in detail with reference to the drawings. In the following description, configurations and operations similar to those of the first embodiment or the modification thereof are cited, and thus redundant description is omitted.

In the first embodiment and the modification thereof described above, the position information of the biological particle P in the well 21 is presented to the user using the 2D map or the 3D map constructed from the event data acquired by the EVS 131. On the other hand, in the second embodiment, a case in which the imaging unit 13 includes the frame-type image sensor separately from the EVS 131, and the position information of the biological particle P in the well 21 is presented to the user using the image data acquired by the image sensor is exemplified.

Figure 22:
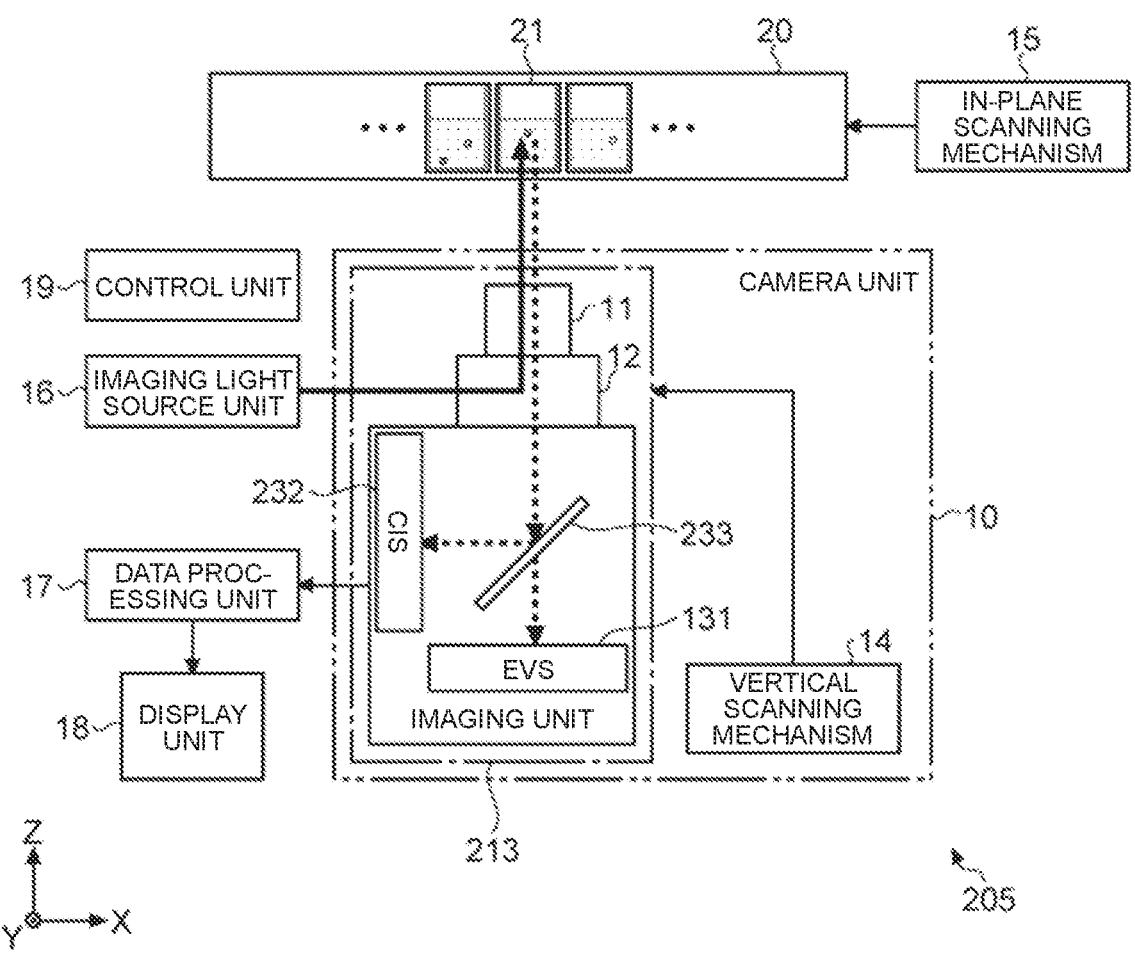
FIG. 22 is a block diagram illustrating a schematic configuration example of a measurement unit for the number of particles according to a second embodiment.

4.1 Schematic Configuration Example of Measurement Unit for the Number of Particles FIG. 22 is a block diagram illustrating a schematic configuration example of a measurement unit for the number of particles according to the present embodiment. As illustrated in FIG. 22, a measurement unit for the number of particles 205 according to the present embodiment has a configuration in which the imaging unit 13 in the camera unit 10 is replaced with an imaging unit 213 in a configuration similar to the measurement unit for the number of particles 105 described with reference to FIG. 5 in the first embodiment.

The imaging unit 213 includes the EVS 131, a frame-type image sensor (hereinafter, also referred to as CIS) 232, and a half mirror 233.

For example, the half mirror 233 is inclined at a predetermined angle (for example, 45 degrees) with respect to the optical axis of the objective lens 11. The EVS 131 is disposed, for example, at a position to receive light transmitted through the half mirror 233, and the CIS 232 is disposed, for example, at a position to receive light reflected by the half mirror 233.

Other configurations may be similar to those of the first embodiment or the modification thereof.

4.2 Example of Flow of Operation of Measuring the Number of Particles

Figure 23:
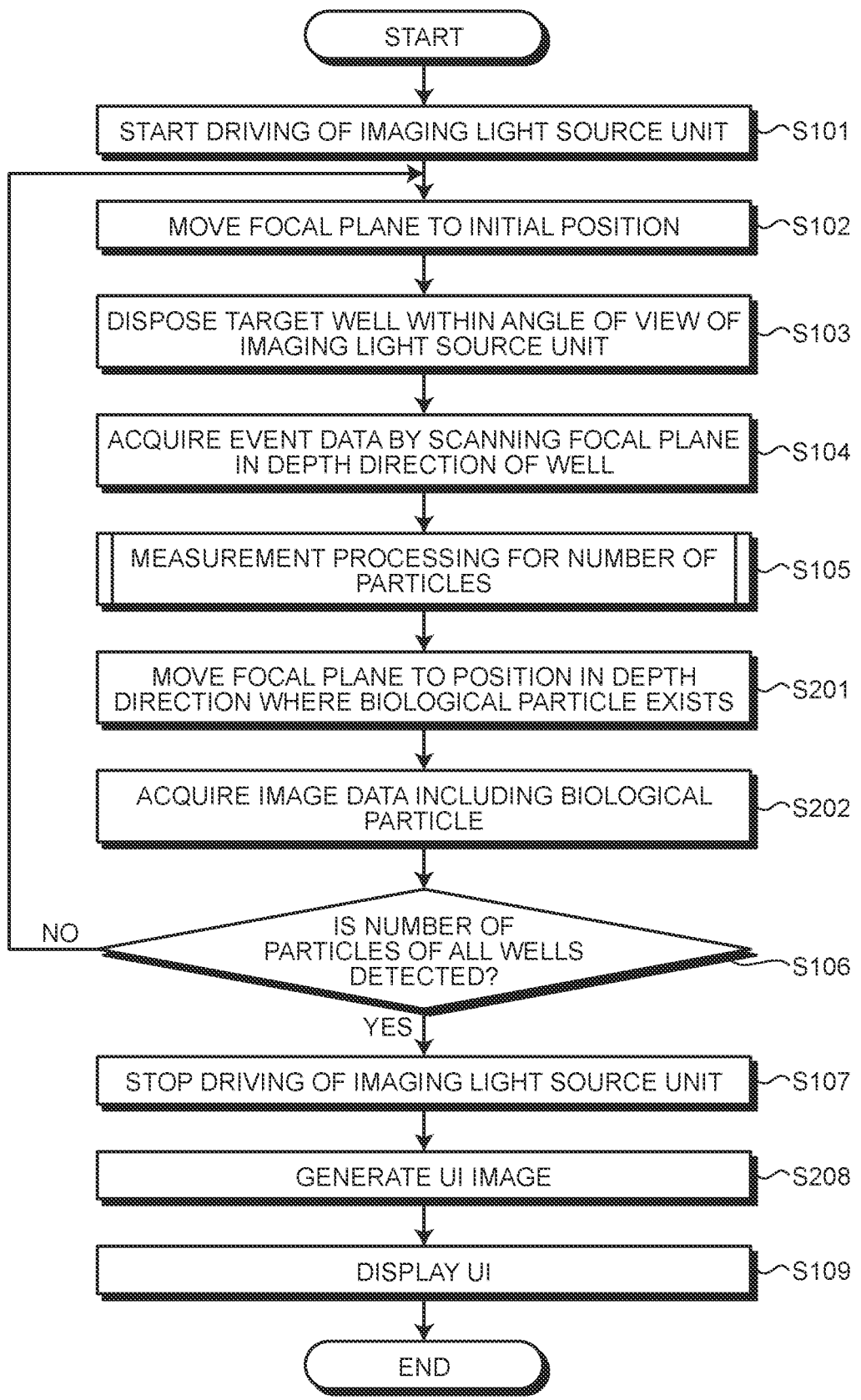
FIG. 23 is a flowchart illustrating an example of a flow of an operation of measuring the number of particles according to the second embodiment.

Next, a description will be given as to an example of a flow of an operation of measuring the number of particles executed by the measurement unit for the number of particles 205 according to the present embodiment. FIG. 23 is a flowchart illustrating an example of a flow of the operation of measuring the number of particles according to the present embodiment. It is noted that, since the operation illustrated in FIG. 23 may be controlled by the control unit 19 similarly to FIG. 12, attention is paid to the operation of the control unit 19 in the following description.

As illustrated in FIG. 23, in the operation of measuring the number of particles according to the present embodiment, the number of the biological particles P in the well 21 to be observed and the position thereof are specified by the same operation as Steps S101 to S105 in FIG. 12.

Next, the control unit 19 moves the focal position of the objective lens 11 to the position in the depth direction where the biological particle P exists by controlling the vertical scanning mechanism 14 based on the position of the biological particle P in the well 21 specified by the measurement processing for the number of particles in Step S105 (Step S201).

Next, the control unit 19 drives the CIS 232 in a state where the biological particle P in the well 21 to be observed is in focus, thereby acquiring image data of the XY plane where the biological particle P in the well 21 exists (Step S202). The acquired image data is transmitted to the data processing unit 17.

Thereafter, as in Step S106 in FIG. 12, the control unit 19 determines whether the measurement processing for the number of particles is executed for all the wells 21, each of which serves as a sorting destination of the biological particle P in the well plate 20 (Step S106). Here, in a case where the measurement processing for the number of particles is not completely executed (NO in Step S106), the processing returns to Step S102. In a case where the measurement processing for the number of particles is completely executed (YES in Step S106), the control unit 19 stops the driving of the imaging light source unit 16 (Step S107).

Subsequently, the control unit 19 generates a UI for presenting the number of the biological particles P for each well 21 and/or the position thereof to the user based on the number of the biological particles P for each well 21 measured in Step S105 and the position thereof (Step S208). At that time, in the present embodiment, the image data acquired in Step S202 may be used as information indicating the position of the biological particle P for each well 21. For example, the information indicating the position of the biological particle P in the well 21 may be presented to the user by displaying image data (or a thumbnail image thereof) of each well 21 acquired in Step S202 in each square of the UI (refer to FIG. 17) displayed on the display unit 18. Alternatively, the image data of the well 21 corresponding to the square selected by the user using an input interface such as a mouse, a keyboard, or a touch panel may be displayed to the user by switching a screen or a window, a new window, or the like.

Thereafter, the control unit 19 displays the UI generated in Step S208 on the display unit 18 (Step S109), and ends this operation.

4.3 Action and Effect

As described above, in the present embodiment, the image data acquired by the frame-type image sensor (the CIS 232) is displayed to the user as the information indicating the position of the biological particle P for each well 21. Accordingly, clearer and more detailed position information of the biological particle P can be provided to the user.

Other configurations, operations, and effects may be similar to those of the above-described embodiment or the modification thereof, and thus detailed description thereof is omitted here.

5. Hardware Configuration

Figure 24:
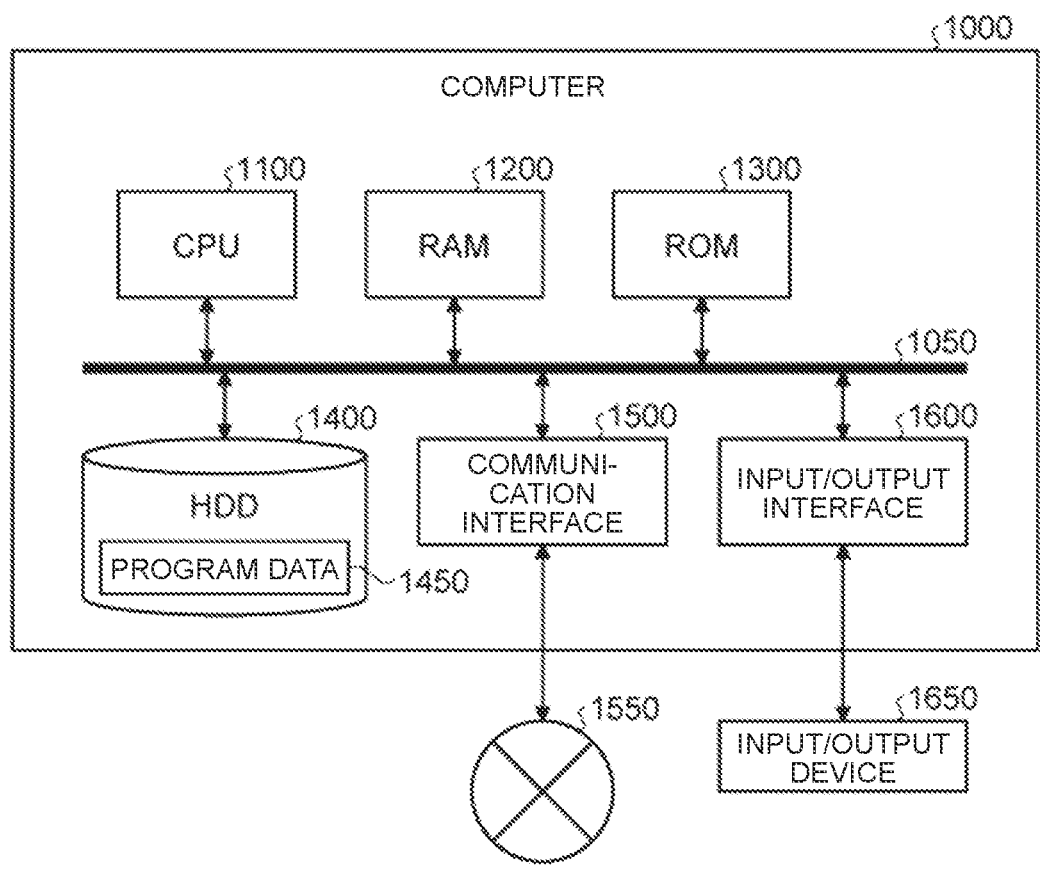
FIG. 24 is a hardware configuration diagram illustrating an example of a computer that implements functions of an information processing apparatus according to the present disclosure.

The signal processing unit 123, the information processing unit 103, and the data processing unit 17 according to the above-described embodiment and the modifications thereof can be realized by, for example, a computer 1000 having a configuration as illustrated in FIG. 24. FIG. 24 is a hardware configuration diagram illustrating an example of the computer 1000 that implements the functions of the signal processing unit 123, the information processing unit 103, and the data processing unit 17. The computer 1000 includes a CPU 1100, a RAM 1200, a read only memory (ROM) 1300, a hard disk drive (HDD) 1400, a communication interface 1500, and an input/output interface 1600. The respective units of the computer 1000 are connected to each other by a bus 1050.

The CPU 1100 operates based on a program stored in the ROM 1300 or the HDD 1400, and controls each unit. For example, the CPU 1100 loads the program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 is started, a program dependent on the hardware of the computer 1000, and the like.

The HDD 1400 is a computer-readable recording medium that non-transiently records a program executed by the CPU 1100, data used by the program, and the like. Specifically, the HDD 1400 is a recording medium that records a program for realizing each operation according to the present disclosure which is an example of program data 1450.

The communication interface 1500 is an interface configured to allow the computer 1000 to be connected to an external network 1550 (for example, the Internet). For example, the CPU 1100 receives data from another device or transmits data generated by the CPU 1100 to another device via the communication interface 1500.

The input/output interface 1600 is an interface configured to connect an input/output device 1650 to the computer 1000. For example, the CPU 1100 receives data from an input device such as a keyboard or a mouse via the input/output interface 1600. In addition, the CPU 1100 transmits data to an output device such as a display, a speaker, or a printer via the input/output interface 1600. Furthermore, the input/output interface 1600 may function as a media interface configured to read a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the signal processing unit 123, the information processing unit 103, and the data processing unit 17 according to the above-described embodiments, the CPU 1100 of the computer 1000 implements the functions of the signal processing unit 123, the information processing unit 103, and the data processing unit 17 by executing the program loaded on the RAM 1200. In addition, the HDD 1400 stores a program and the like according to the present disclosure. It is noted that the CPU 1100 reads the program data 1450 from the HDD 1400 and executes the program data, but as another example, these programs may be acquired from another device via the external network 1550.

Although embodiments of the present disclosure have been described above, the technical scope of the present disclosure is not limited to the above-described embodiments as it is, and various modifications can be made without departing from the gist of the present disclosure. In addition, components of different embodiments and modifications may be appropriately combined.

Furthermore, the effects of each embodiment described in the present specification are merely examples and are not limited, and other effects may be obtained.

It is noted that the present technology can also have the following configurations.

(1)

A particle analysis system including:
- an imaging unit configured to detect, as an event, a luminance change of light from a particle in a container;
- a first scanning unit configured to scan a focal position of the imaging unit in a depth direction of the container; and
- a processing unit configured to measure a state in the container based on the events detected at a plurality of the focal positions of the imaging unit by scanning of the first scanning unit.

(2)

The particle analysis system according to (1), further including a storage unit configured to record the focal position of the imaging unit at two or more different points of time while the first scanning unit scans the focal position of the imaging unit in the depth direction of the container.

(3)

The particle analysis system according to (1) or (2), wherein
- the imaging unit includes:
- an objective lens facing the container; and
- a first sensor unit including a plurality of pixels, each of the pixels detecting, as the event, the luminance change of the light from the particle in the container incident through the objective lens, and
- the first scanning unit is configured to scan the focal position of the objective lens in the depth direction of the container.

(4)

The particle analysis system according to (3), wherein the first scanning unit is configured to scan the focal position in the depth direction of the container by changing a relative position between the objective lens and the container in the depth direction.

(5)

The particle analysis system according to (3), wherein:
- the objective lens includes one or more lenses; and
- the first scanning unit is configured to scan the focal position in the depth direction of the container by moving, in the depth direction, at least one lens among the one or more lenses of the objective lens.

(6)

The particle analysis system according to any one of (1) to (5), further including an imaging light source unit configured to irradiate the particle in the container with light, wherein the imaging unit is configured to detect, as the event, a luminance change of fluorescence emitted from the particle irradiated with the light from the imaging light source unit.

(7)

The particle analysis system according to any one of (1) to (5), further including an imaging light source unit configured to irradiate the particle in the container with light, in which the imaging unit is configured to detect, as the event, a luminance change of the light output from the imaging light source unit and reflected or scattered by the particle.

(8)

The particle analysis system according to (6) or (7), wherein
- the imaging unit further includes an optical system configured to reflect the light from the imaging light source unit and to allow the light from the particle in the container to be transmitted therethrough,
- the particle in the container is irradiated with the light from the imaging light source unit reflected by the optical system, and
- the light from the particle in the container is transmitted through the optical system and incident on the imaging unit.

(9)

The particle analysis system according to (6) or (7), wherein
- the imaging light source unit is configured to irradiate, from a first side, the container with the light, and
- the imaging unit is configured to detect, as the event, the luminance change of the light from the particle, wherein the light travels to a second side opposite the first side.

(10)

The particle analysis system according to any one of (1) to (9), wherein the processing unit is configured to measure the state in the container based on the number of events positioned in a vicinity of one event in a spatial direction and/or a time direction.

(11)

The particle analysis system according to any one of (1) to (10), wherein the processing unit is configured to measure, based on the event, the number of particles in the container as the state in the container.

(12)

The particle analysis system according to any one of (1) to (11), wherein the processing unit is configured to measure, based on the event, a position of the particle in the container as the state in the container.

(13)

The particle analysis system according to any one of (1) to (12), wherein the processing unit is configured to generate a user interface that presents the measured state in the container to a user.

(14)

The particle analysis system according to (13), wherein the processing unit is configured to generate, as the user interface, a two-dimensional map or a three-dimensional map in the container, wherein the two-dimensional map or the three-dimensional map is constructed from the event.

(15)

The particle analysis system according to (13) or (14), wherein
- the imaging unit further includes a second sensor unit configured to image the light from the particle in the container and to generate image data, and
- the processing unit is configured to generate the user interface based on the image data acquired by the second sensor unit.

(16)

The particle analysis system according to (15), wherein
- the first scanning unit is configured to move the focal position of the imaging unit in the depth direction of the container based on the state in the container measured based on the event, and
- the second sensor unit is configured to generate the image data by imaging the light from the particle in the container in a state where the focal position of the imaging unit is moved based on the state in the container.

(17)

The particle analysis system according to any one of (1) to (15), further including a second scanning unit configured to sequentially move one of a plurality of the containers arranged in a matrix within an angle of view of the imaging unit, wherein
  the first scanning unit is configured to scan, for each of the containers, the focal position of the imaging unit in the depth direction of the container, and
  the processing unit is configured to measure, for each of the containers, the state in the container based on the event detected at the plurality of focal positions of the imaging unit by the scanning of the first scanning unit.

(18)

The particle analysis system according to any one of (1) to (17), wherein the particle is a cell or a non-cellular biological particle.

(19)

The particle analysis system according to any one of (1) to (18), further including:
  a detection light source unit configured to irradiate the particle passing through a predetermined flow channel with light;
  a detection unit configured to detect light emitted from the particle irradiated with the light from the detection light source unit; and
  a sorting unit configured to sort the particle into the container based on a detection result by the detection unit.

(20)

The particle analysis system according to any one of (1) to (18), in which the container is a droplet independent on a plane.

(21)

A particle analysis method of a particle analysis system including an imaging unit configured to detect, as an event, a luminance change of light from a particle in a container, the particle analysis method including the steps of:
  scanning a focal position of the imaging unit in a depth direction of the container; and
  measuring a state in the container based on the events detected at a plurality of the focal positions of the imaging unit by scanning of the focal position.

(22)

The particle analysis method according to (21), in which the container is a droplet independent on a plane.

(23)

A flow cytometer system including:
  a detection light source unit configured to irradiate a biological particle passing through a predetermined flow channel with light;
  a detection unit configured to detect light emitted from the biological particle irradiated with the light from the detection light source unit;
  a sorting unit configured to sort the biological particle into a predetermined container based on a detection result by the detection unit;
  an imaging light source unit configured to irradiate the biological particle in the container with light;
  an imaging unit configured to detect, as an event, a luminance change of light from the biological particle in the container, wherein the biological particle is irradiated with the light from the imaging light source unit;
  a scanning unit configured to scan a focal position of the imaging unit in a depth direction of the container; and
  a processing unit configured to measure a state in the container based on the events detected at a plurality of the focal positions of the imaging unit by scanning of the scanning unit.

REFERENCE SIGNS LIST

10 CAMERA UNIT
11 OBJECTIVE LENS
12 BEAM SPLITTER
13 IMAGING UNIT
14 VERTICAL SCANNING MECHANISM
15, 55 IN-PLANE SCANNING MECHANISM
16 IMAGING LIGHT SOURCE UNIT
17 DATA PROCESSING UNIT
18 DISPLAY UNIT
19 CONTROL UNIT
20 WELL PLATE
21 WELL
22 FRAME
30 PIXEL
31, 41 PIXEL ARRAY UNIT
32 VERTICAL DRIVE CIRCUIT
33 COLUMN PROCESSING CIRCUIT
34 HORIZONTAL DRIVE CIRCUIT
35 SYSTEM CONTROL UNIT
38 SIGNAL PROCESSING UNIT
39 DATA STORAGE UNIT
40 EVENT PIXEL
42 X ARBITER
43 Y ARBITER
44 EVENT SIGNAL PROCESSING CIRCUIT
45 SYSTEM CONTROL CIRCUIT
46 OUTPUT I/F
51 SAMPLE
52 PARTICLE IDENTIFICATION MECHANISM
53 INDEX SORTING MECHANISM
54 WASTE LIQUID
100 PARTICLE ANALYSIS SYSTEM
100A FLOW CYTOMETER
100B MEASUREMENT APPARATUS FOR NUMBER OF PARTICLES
101 LIGHT IRRADIATION UNIT
102 DETECTION UNIT
103 INFORMATION PROCESSING UNIT
104 SORTING UNIT
105, 105A, 105B, 205 MEASUREMENT UNIT FOR NUMBER OF PARTICLES
111 DETECTION LIGHT SOURCE UNIT
112 LIGHT GUIDANCE OPTICAL SYSTEM
121 DETECTION OPTICAL SYSTEM
122 IMAGING UNIT
122a IMAGE SENSOR
122b EVS
123 SIGNAL PROCESSING UNIT
124 SPEED MEASUREMENT UNIT
131 EVS
232 CIS (IMAGE SENSOR)
233 HALF MIRROR
C FLOW CHANNEL
P BIOLOGICAL PARTICLE
S BIOLOGICAL SAMPLE

The invention claimed is:

1. A particle analysis system, including:
an imaging unit configured to detect, as an event, a luminance change of light from a particle in a container;
a first scanning unit configured to scan a focal position of the imaging unit in a depth direction of the container; and
a processing unit configured to measure a state in the container based on the events detected at a plurality of the focal positions of the imaging unit by scanning of the first scanning unit.

2. The particle analysis system according to claim 1, further including a storage unit configured to record the focal position of the imaging unit at two or more different points of time while the first scanning unit scans the focal position of the imaging unit in the depth direction of the container.

3. The particle analysis system according to claim 1, wherein
the imaging unit includes:
an objective lens facing the container; and
a first sensor unit including a plurality of pixels, each of the pixels detecting, as the event, the luminance change of the light from the particle in the container incident through the objective lens, and
the first scanning unit is further configured to scan the focal position of the objective lens in the depth direction of the container.

4. The particle analysis system according to claim 3, wherein the first scanning unit is further configured to scan the focal position in the depth direction of the container by changing a relative position between the objective lens and the container in the depth direction.

5. The particle analysis system according to claim 3, wherein
the objective lens includes one or more lenses, and
the first scanning unit is further configured to scan the focal position in the depth direction of the container by moving, in the depth direction, at least one lens among the one or more lenses of the objective lens.

6. The particle analysis system according to claim 1, further including: an imaging light source unit configured to irradiate the particle in the container with light,
wherein the imaging unit is further configured to detect, as the event, a luminance change of fluorescence emitted from the particle irradiated with the light from the imaging light source unit.

7. The particle analysis system according to claim 6, wherein
the imaging unit further includes: an optical system configured to reflect the light from the imaging light source unit and to allow the light from the particle in the container to be transmitted therethrough;
the particle in the container is irradiated with the light from the imaging light source unit reflected by the optical system; and
the light from the particle in the container is transmitted through the optical system and incident on the imaging unit.

8. The particle analysis system according to claim 6, wherein
the imaging light source unit is further configured to irradiate, from a first side, the container with the light, and
the imaging unit is further configured to detect, as the event, the luminance change of the light from the particle, wherein the light travels to a second side opposite the first side.

9. The particle analysis system according to claim 1, wherein the processing unit is further configured to measure the state in the container based on the number of events positioned in a vicinity of one event in a spatial direction and/or a time direction.

10. The particle analysis system according to claim 1, wherein the processing unit is further configured to measure, based on the event, the number of particles in the container as the state in the container.

11. The particle analysis system according to claim 1, wherein the processing unit is further configured to measure, based on the event, a position of the particle in the container as the state in the container.

12. The particle analysis system according to claim 1, wherein the processing unit is further configured to generate a user interface that presents the measured state in the container to a user.

13. The particle analysis system according to claim 12, wherein the processing unit is further configured to generate, as the user interface, a two-dimensional map or a three-dimensional map in the container, wherein the two-dimensional map or the three-dimensional map is constructed from the event.

14. The particle analysis system according to claim 12, wherein
the imaging unit further includes a second sensor unit configured to image the light from the particle in the container and to generate image data, and
the processing unit is further configured to generate the user interface based on the image data acquired by the second sensor unit.

15. The particle analysis system according to claim 14, wherein
the first scanning unit is further configured to move the focal position of the imaging unit in the depth direction of the container based on the state in the container measured based on the event, and
the second sensor unit is further configured to generate the image data by imaging the light from the particle in the container in a state where the focal position of the imaging unit is moved based on the state in the container.

16. The particle analysis system according to claim 1, further including: a second scanning unit configured to sequentially move one of a plurality of the containers arranged in a matrix within an angle of view of the imaging unit, wherein
the first scanning unit is further configured to scan, for each of the containers, the focal position of the imaging unit in the depth direction of the container, and
the processing unit is further configured to measure, for each of the containers, the state in the container based on the event detected at the plurality of focal positions of the imaging unit by the scanning of the first scanning unit.

17. The particle analysis system according to claim 1, wherein the particle is a cell or a non-cellular biological particle.

18. The particle analysis system according to claim 1, further including:
a detection light source unit configured to irradiate the particle passing through a predetermined flow channel with light;

a detection unit configured to detect light emitted from the particle irradiated with the light from the detection light source unit; and a sorting unit configured to sort the particle into the container based on a detection result by the detection unit.

19. A particle analysis method of a particle analysis system including: an imaging unit configured to detect, as an event, a luminance change of light from a particle in a container, the particle analysis method including the steps of:

scanning a focal position of the imaging unit in a depth direction of the container; and measuring a state in the container based on the events detected at a plurality of the focal positions of the imaging unit by scanning of the focal position.

20. A flow cytometer system, including:

a detection light source unit configured to irradiate a biological particle passing through a predetermined flow channel with light;

a detection unit configured to detect light emitted from the biological particle irradiated with the light from the detection light source unit;

a sorting unit configured to sort the biological particle into a predetermined container based on a detection result by the detection unit;

an imaging light source unit configured to irradiate the biological particle in the container with light;

an imaging unit configured to detect, as an event, a luminance change of light from the biological particle in the container, wherein the biological particle is irradiated with the light from the imaging light source unit;

a scanning unit configured to scan a focal position of the imaging unit in a depth direction of the container; and a processing unit configured to measure a state in the container based on the events detected at a plurality of the focal positions of the imaging unit by scanning of the scanning unit.

* * * * *